United States Patent
Hassen

(10) Patent No.: US 11,796,430 B2
(45) Date of Patent: Oct. 24, 2023

(54) GAS KNIFE USING PARALLELOGRAM FLOW

(71) Applicant: Ventana Medical Systems, Inc., Tucson, AZ (US)

(72) Inventor: Charles Hassen, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 80 days.

(21) Appl. No.: 16/656,302

(22) Filed: Oct. 17, 2019

(65) Prior Publication Data
US 2020/0049601 A1    Feb. 13, 2020

Related U.S. Application Data

(63) Continuation of application No. PCT/IB2018/000883, filed on May 17, 2018.

(60) Provisional application No. 62/510,568, filed on May 24, 2017.

(51) Int. Cl.
*G01N 1/31* (2006.01)
*F26B 21/00* (2006.01)
*G01N 35/00* (2006.01)

(52) U.S. Cl.
CPC .......... *G01N 1/312* (2013.01); *F26B 21/004* (2013.01); *G01N 35/00029* (2013.01); *G01N 2035/00168* (2013.01)

(58) Field of Classification Search
CPC ............. G01N 1/312; G01N 35/00029; G01N 2035/00168; G01N 1/30; G01N 1/31; G01N 35/028; F26B 21/004
See application file for complete search history.

(56) References Cited

U.S. PATENT DOCUMENTS

| 5,425,918 | A  |   | 6/1995  | Healey et al. |
|-----------|----|----|---------|---------------|
| 5,698,162 | A  |   | 12/1997 | Belly et al. |
| 6,094,301 | A  |   | 7/2000  | Dreyer et al. |
| 6,491,190 | B1 | * | 12/2002 | Dunworth ............. B22D 41/54 222/603 |
| 2005/0186114 | A1 | * | 8/2005 | Reinhardt ............... G01N 1/36 422/65 |
| 2009/0253592 | A1 |   | 10/2009 | Kram |
| 2015/0031071 | A1 |   | 1/2015 | Winther |
| 2016/0282239 | A1 | * | 9/2016 | Capps .................... G01N 35/10 |
| 2016/0282375 | A1 | * | 9/2016 | Barnett ............ G01N 35/00029 |
| 2016/0282376 | A1 | * | 9/2016 | Keller ...................... G01N 1/30 |

FOREIGN PATENT DOCUMENTS

| CN | 105980827 A | 9/2016 |
| JP | H06504115 A | 5/1994 |
| JP | 2003039026 A | 2/2003 |

(Continued)

OTHER PUBLICATIONS

International Search Report and Written Opinion for PCT/IB2018/000883 (WO2018215843), dated Nov. 19, 2018.

*Primary Examiner* — Matthew D Krcha
*Assistant Examiner* — Tingchen Shi
(74) *Attorney, Agent, or Firm* — Charney IP Law LLC; Thomas M. Finetti

(57) ABSTRACT

In one aspect of the present disclosure is a method of contactlessly urging, directly, or moving a substance on the surface of a substrate, the method employing a gas knife (300) configured to produce a gas curtain having parallelogram flow.

15 Claims, 15 Drawing Sheets

(56) References Cited

FOREIGN PATENT DOCUMENTS

| | | |
|---|---|---|
| JP | 2007516447 A | 6/2007 |
| JP | 2009080139 A | 4/2009 |
| JP | 2013092532 A | 5/2013 |
| JP | 2016540982 A | 12/2016 |
| WO | 1992001919 A1 | 2/1992 |
| WO | 2004001390 A1 | 12/2003 |
| WO | 2005064309 A1 | 7/2005 |
| WO | 2015086485 A1 | 6/2015 |
| WO | 2015086531 A1 | 6/2015 |

* cited by examiner

GAS KNIFE USING PARALLELOGRAM FLOW

CROSS REFERENCE TO RELATED APPLICATIONS

The present application is a continuation of International Application No. PCT/IB2018/000883, filed on May 17, 2018, which application claims the benefit of the filing date of U.S. Provisional Patent Application No. 62/510,568, filed on May 24, 2017, the disclosures of which are hereby incorporated by reference herein in their entireties.

BACKGROUND OF THE DISCLOSURE

Biological samples/specimens, e.g., tissue sections or cells, are often mounted on microscope slides for examination. While on the slide, the specimens are often treated with one or more substances (e.g., dyes, reagents, etc.) to add color and contrast or microscopically labeled reagents to otherwise transparent or invisible cells or cell components. The treated specimens are often then covered with a thin transparent coverslip. This is done for several reasons. The coverslip can flatten the specimen so that the specimen is in the same viewing plane, thereby allowing one to view the specimen better. The coverslip provides protection for the specimen from the objective lens of the microscope should the lens be placed too closely to the slide. The coverslip (often in combination with an adhesive) further provides protection for the specimen such that it will be permanently retained on the slide and preserved for future study and archival purposes. The coverslip also helps to avoid contamination of the specimen.

BRIEF SUMMARY OF THE DISCLOSURE

In one aspect of the present disclosure is a method for contactlessly urging, directing, or moving a substance (e.g. a fluid, a particulate solid, or any combination thereof) on the surface of a substrate, the method employing a gas curtain having parallelogram flow (e.g. a gas curtain provided by a gas knife). In some embodiments, the substrate is a microscope slide and the substance is a fluid. In some embodiments, the method further comprises the removal of the fluid from the surface of the microscope slide by utilizing the gas curtain to direct the fluid along a processing pathway and toward either a wicking feature in communication with the microscope slide or a longitudinal side of the slide. In some embodiments, the method is utilized during a coverslipping process such that the formation of at least one of glue streaks or bubbles are mitigated or prevented.

In another aspect of the present disclosure is an automated slide processing apparatus, including at least one fluid dispenser configured to dispense a fluid onto a slide; and a liquid removal device for driving the fluid present on an upper surface of the slide (e.g. the dispensed fluid alone or in combination with an existing fluid already presented on the slide) toward one of (i) a wicking feature in communication with at least a portion of an end of the slide (e.g. a clip in contact with an edge of the slide), or (ii) a longitudinal edge of the slide; where the liquid removal device projects a gas curtain having a shape which approximates a parallelogram. In some embodiments, the liquid removal device is movable in a direction substantially perpendicular to a longitudinal axis of the slide. By "substantially perpendicular to a longitudinal axis of the slide," it is meant that the liquid removal device may be offset by at most 5% from the perpendicular. In some embodiments, a gas curtain projected from the liquid removal device is oriented substantially perpendicular to a plane of the upper surface of the slide. In some embodiments, the gas curtain is offset at a predetermined slant angle relative to a longitudinal axis of the gas knife.

In some embodiments, the wicking feature is a slide retaining clip. In some embodiments, the slide retaining clip is located at a label end of the slide. In some embodiments, the wicking feature is composed of a material that draws fluid from the slide (such as by capillary action), thus facilitating the at least partial removal of the fluid from the slide. In some embodiments, the wicking feature is in physical contact with an edge of the slide, a top of the slide, or both.

In some embodiments, the automated slide processing apparatus is a coverslipper apparatus and the liquid removal device facilitates removal of at least residual fluid after application of a coverslip to the slide. In some embodiments, the automated slide processing apparatus is a coverslipper apparatus and wherein the liquid removal device facilitates removal of at least residual fluid prior to the application of a coverslip to the slide. In some embodiments, the automated slide processing apparatus is a coverslipper apparatus and wherein the liquid removal device is used to facilitate the removal of fluid both before and after a coverslipping process (i.e. prior to application of a coverslipping fluid, prior laydown of a coverslip, and following the "squeezing out" of fluid from between the upper surface of the slide and the coverslip).

In some embodiments, the automated slide processing apparatus is a staining apparatus wherein the liquid removal device facilitates removal of at least a first fluid puddle dispensed onto a specimen located on the upper surface of the slide, the first fluid puddle comprising a fluid selected from the group consisting of a staining reagent, a counterstaining reagent, a buffer, or a wash reagent. In some embodiments, following removal of a first fluid puddle, a second fluid may be dispensed onto the slide.

In another aspect of the present disclosure is an automated slide processing apparatus comprising: (i) at least one fluid dispenser configured to dispense a fluid onto a slide; and (ii) a gas knife configured to direct a fluid along a processing pathway and at least toward a wicking feature, wherein the gas knife includes a plurality of discrete gas outlets in fluidic communication with a plenum, the plurality of discrete gas outlets each providing a gaseous output that merge to form a substantially uniform gas curtain. In some embodiments, the substantially uniform gas curtain is offset at a slant angle (as defined herein) of at least 10 degrees relative to a longitudinal axis of a plenum. In some embodiments, the size of the gas curtain approximates the size of the slide, e.g. within about 20% of the longitudinal length of the slide.

In some embodiments, the wicking feature provides a wicking contact to facilitate removal of the fluid from the slide (e.g. enables removal through capillary action). In some embodiments, the wicking feature is located at one end of the slide. In some embodiments, the wicking feature is a retaining clip. In some embodiments, the wicking feature is in physical contact with an edge of the slide, a top of a slide, or both.

In some embodiments, the gas knife is movable in a direction substantially perpendicular to the longitudinal axis of the slide. In some embodiments, the gas knife is movable at a velocity ranging from between about 0.75 inches/second (1.905 cm/second) to about 1.25 inches/second (3.175 cm/second). In some embodiments, the gas knife is configured to move in a first direction substantially perpendicular to the longitudinal axis of the slide and toward a first longitudinal edge to urge the fluid towards a first wicking feature; and wherein the device is operable in a second direction substantially perpendicular to the longitudinal axis of the slide and toward a second edge to urge fluid toward a second wicking feature. In some embodiments, the first direction and the second direction are opposite each other but within the same plane.

In some embodiments, wherein any two adjacent gas outlets provide substantially the same gas flow rate. In some embodiments, the substantially uniform gas curtain provides a gas flow rate of between about 10 L/min to about 20 L/min.

In some embodiments, an angle of incidence between the substantially uniform gas curtain and the fluid on the surface of the slide is about 90 degrees. In some embodiments, the slant angle ranges from between about 20 degrees to about 40 degrees. In some embodiments, the slant angle is about 30 degrees. In some embodiments, the gas curtain establishes a parallelogram-type flow.

In another aspect of the present disclosure is a gas knife comprising a plenum and a plurality of outlets in fluidic communication with the plenum, the plurality of outlets arranged in parallel along an end of the plenum, each gas outlet provided at a slant angle relative to a longitudinal axis of the plenum ranging from between about 20 degrees and about 40 degrees, and wherein a ratio between a length of the outlet and a diameter of the outlet is greater than 5. In some embodiments, the outlets are provided at a pitch of between about 3 and about 20 outlets per inch (2.54 cm). In some embodiments, the pitch ranges from between about 5 and about 15. In some embodiments, the pitch ranges from between about 8 to about 12. In some embodiments, the pitch is about 10. In some embodiments, the ratio between the length of the outlet and the diameter of the outlet is greater than 7.5. In some embodiments, the ratio is greater than 10. In some embodiments, the slant angle of the outlet relative to the longitudinal axis of the plenum ranges from about 25 degrees to about 35 degrees. In some embodiments, the slant angle of the outlet relative to the longitudinal axis of a plenum is about 30 degrees; the outlets are provided at a pitch of between about 8 and about 12 outlets per inch (2.54 cm); and the ratio between the length of the outlet and the diameter of the outlet is greater than 5.

In another aspect of the present disclosure is an automated coverslipper comprising a fluid dispenser; and a gas knife comprising a plenum and a plurality of outlets in fluidic communication with the plenum, the plurality of outlets arranged in parallel along a line at an end of the plenum, each gas outlet provided at a slant angle relative to a longitudinal axis of the plenum, the slant angle ranging from between about 20 degrees and about 40 degrees, and wherein a ratio between a length of the outlet and a diameter of the outlet is greater than 5. In some embodiments, the automated coverslipper further comprises means for applying a coverslip (e.g. a lifter head) to the upper surface of a slide. Devices for applying a coverslip, including lifter heads, etc., are disclosed within WO2016005347A1, the disclosure of which is hereby incorporated by reference herein in its entirety.

In another aspect of the present disclosure is an automated slide staining apparatus comprising a fluid dispenser for delivering a reagent to an upper surface of a slide; and a gas knife comprising a plenum and a plurality of outlets in fluidic communication with the plenum, the plurality of outlets arranged in parallel along a line at the end of the plenum, each gas outlet provided at a slant angle relative to a longitudinal axis of the plenum ranging from between about 20 degrees and about 40 degrees, and wherein a ratio between a length of the outlet and a diameter of the outlet is greater than 5.

In another aspect of the present disclosure is a method of moving fluid present on an upper surface of a substrate, comprising: (a) positioning a gas knife proximal a first longitudinal edge of a substrate, the gas knife configured to provide a substantially uniform gas curtain directed toward the substrate, the gas curtain having a flow rate of between about 10 L/min and about 20 L/min per air knife; (b) moving the gas knife across the substrate at a velocity of between about 0.75 inches/second (1.905 cm/second) and about 1.25 inches/second (3.175 cm/second) in a direction substantially perpendicular to the longitudinal axis of the substrate, wherein the gas knife maintains a height separation from the upper surface of the substrate throughout its movement, the height separation ranging from between about 0.30 cm to about 0.70 cm. In some embodiments, the gas curtain imparts parallelogram flow, as described herein. In some embodiments, the height separation ranges from between about 0.35 cm to about 0.65 cm.

In some embodiments, the gas curtain directs flow of the fluid over an upper surface of the substrate toward a wicking feature (e.g. a slide retaining clip) in communication with the substrate (e.g. a slide retaining clip in physical contact with an edge of the slide). In some embodiments, the gas knife is moved in a first direction substantially perpendicular to the longitudinal axis of the substrate and ends at a position proximal a second longitudinal edge of the substrate. In some embodiments, the fluid is directed toward the second longitudinal edge and/or toward a second wicking feature. In some embodiments, the substrate is a microscope slide and the wicking features are in communication with an end of the slide.

In some embodiments, the method further comprises the step of moving the gas knife in a second direction originating at a position proximal the second longitudinal edge of the substrate and toward the first longitudinal edge of the substrate. In some embodiments, the fluid is directed toward the first longitudinal edge and/or toward a first wicking feature in communication with the substrate. In some embodiments, the method further comprises positioning a liquid dispensing means (e.g. a fluid dispenser as described further herein) over an upper surface of the substrate and dispensing a liquid onto a portion of substrate or onto a substance residing on the surface of the substrate. In some embodiments, the substrate is a microscope slide and the liquid is dispensed onto a specimen disposed on the surface of the microscope slide.

In another aspect of the present disclosure is a method of at least mitigating the formation of glue streaks and/or bubbles during a coverslipping process comprising (i) removing residual fluid from the upper surface of a microscope slide, the process comprising moving a gas knife configured to provide parallelogram flow (as defined herein) across the slide in a direction perpendicular to the longitudinal axis of the slide such that the residual fluid is urged toward a wicking feature in communication with the slide; (ii) applying coverslipping fluid to the surface of the slide; (iii) laying down a coverslip onto the surface of the slide; (iv) removing fluid squeezed out from between the upper surface of the microscope slide and the coverslip, the removal process comprising moving a gas knife configured to provide parallelogram flow across the slide in a direction perpendicular to the longitudinal axis of the slide such that the residual fluid is urged toward a wicking feature in communication with the slide; and (v) curing the microscope the slide in an oven after a predetermined delay period. It is believed that care must be taken to employ a gas flow rate sufficient to urge the fluid to the wicking feature, but low enough not to cause the coverslip to substantially migrate from its desired position above the specimen on the slide.

Many specimen processing steps require the removal of excess fluids and/or reagents. A contactless fluid removal method is desirable so as not to damage or contaminate the biological sample or substrate to which it is adhered. Applicants have developed an improved process for removing residual fluids from the surface of a substrate, e.g. a microscope slide. Indeed, through the use of a gas knife employing "parallelogram" type flow Applicants, have shown that the disclosed process provides a superior method of reducing streaks, e.g. glue streaks, observable between a microscope slide and a coverslip placed on top of the slide. Applicants have also demonstrated that the presence of such streaks may be minimized while also enhancing the removal of residual fluid volume from the slide. Applicants have further demonstrated that these improvements may be achieved without the risk of coverslip migration. In addition, Applicants have developed a gas knife that is operable in two directions thereby further improving the removal of residual fluid from the surface of a slide and/or increasing overall throughput.

DETAILED DESCRIPTION

Definitions

Figure 1:
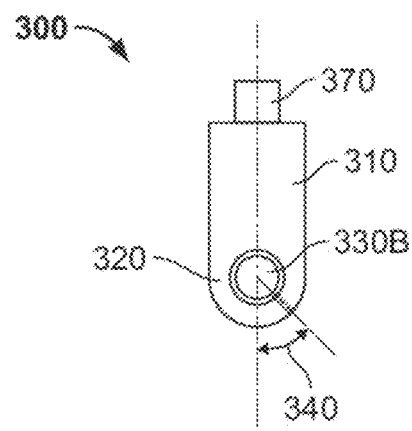
FIG. 1 is a side view of a gas knife according to one embodiment of the present disclosure.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "biological specimen," "sample," "specimen," or like terms refer to any specimen (e.g., sample) including biomolecules (e.g., proteins, peptides, nucleic acids, lipids, carbohydrates, and combinations thereof) that is obtained from (or includes) any organism, including viruses. Biological specimens can include tissue samples (e.g., tissue sections), cell samples (e.g., cytological smears such as Pap or blood smears or samples of cells obtained by microdissection), samples of whole organisms (e.g., samples of yeast, bacteria, etc.), or cell fractions, fragments or organelles, such as those obtained by lysing cells and separating their components by centrifugation or otherwise. Other examples of biological specimens include, without limitation, blood, serum, urine, semen, fecal matter, cerebrospinal fluid, interstitial fluid, mucous, tears, sweat, pus, biopsied tissue (e.g., obtained by a surgical biopsy or a needle biopsy), nipple aspirates, milk, vaginal fluid, saliva, swabs (e.g., buccal swabs), or any material containing biomolecules derived therefrom.

As used herein, the term "fluids" refers to any liquid, including water, solvents, solutions (e.g. buffer solutions), etc. The term "fluids" also refers to any mixtures, colloids, suspensions, etc. The term "fluids" also encompasses reagents, stains, and other specimen processing agents (e.g. glues, fixatives, etc.) which may be applied to a microscope slide and/or specimen. The fluids may be aqueous or non-aqueous. Further examples include solutions or suspensions of antibodies, solutions or suspensions of nucleic acid probes, and solutions or suspensions of dye or stain molecules (e.g., H&E staining solutions, Pap staining solutions, etc.). Still further examples of fluids include solvents and/or solutions for deparaffinizing paraffin-embedded biological specimens, aqueous detergent solutions, and hydrocarbons (e.g., alkanes, isoalkanes and aromatic compounds such as xylene). Still further examples of fluids include solvents (and mixtures thereof) used to dehydrate or rehydrate biological specimens.

As used herein, the terms "reagent" refers to any liquid or liquid composition used in a specimen processing operation that involves adding liquid or liquid composition to a slide. Examples of reagents and processing liquids include solutions, emulsions, suspensions, and solvents (either pure or mixtures thereof). These and other examples can be aqueous or non-aqueous. Further examples include solutions or suspensions of specific-binding entities, antibodies, solutions or suspensions of nucleic acid probes, and solutions or suspensions of dye or stain molecules (e.g., H&E staining solutions, Pap staining solutions, etc.). Still further examples include solvents and/or solutions for deparaffinizing paraffin-embedded biological specimens, aqueous detergent solutions, and hydrocarbons (e.g., alkanes, isoalkanes and aromatic compounds such as xylene).

As used herein, the term "plurality" refers to two or more, for example, 3 or more, 4 or more, 5 or more, etc.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide.

As used herein, the term "stain" refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures and organisms not only with bright-field microscopes, but also with other viewing tools, such as phase contrast microscopes, electron microscopes, and fluorescence microscopes. Examples of types of staining methods performed by the system include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH).

Gas Knife

Disclosed herein is a gas knife which may be used in any process requiring the contactless removal of a liquid from a substrate. While the gas knife disclosed herein may, in some embodiments, be described for use in conjunction with automated slide preparation devices, e.g. a coverslipping apparatus, a staining apparatus, or the like, the gas knife is not limited to use in conjunction with such devices. Indeed, the skilled artisan may use the disclosed gas knife described herein, or any variant thereof, for any purpose in which a stream of gas is needed for contactlessly removing any substance (e.g. liquids, particulate/granulate solids, or mixtures of liquids and solids etc.) from a surface of a substrate. For example, the gas knife disclosed herein may be used to remove contaminates from printed circuit boards, silicon wafers, etc. Likewise, the gas knifes of the present may be "scaled-up" in size and used for removing fluids or particulates such as dirt or dust in an industrial setting, such as drying operations after painting or after cleaning with fluids such as in car washes or industrial production operations; or for removing machining process debris in milling or drilling or surface finishing manufacturing processes; or for gas flow management in air curtains for use in building doorways.

As will be appreciated by the person of ordinary skill in the art, the gas knife can be used with a variety of suitable gases, such as air, nitrogen, air/nitrogen mixtures, or other gases compatible with processing liquids and tissue specimens. The gas knife can output streams of air (e.g., ambient air, filtered air, etc.) to produce an air curtain, streams of nitrogen to produce a nitrogen curtain, or streams of other gases to produce other types of gas curtains. Though the term "air knife" may be used with reference to some embodiments herein, unless the context clearly indicates otherwise, the term also refers to gas knives capable of producing gas curtains comprised of any suitable gases.

Figure 2:
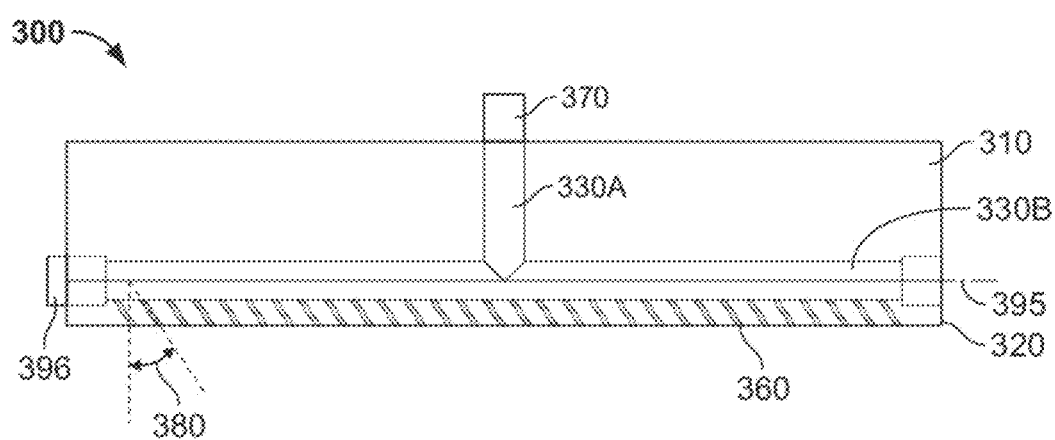
FIG. 2 illustrates a planar, cross-sectional view of a gas knife according to another embodiment of the present disclosure.
Figure 3:
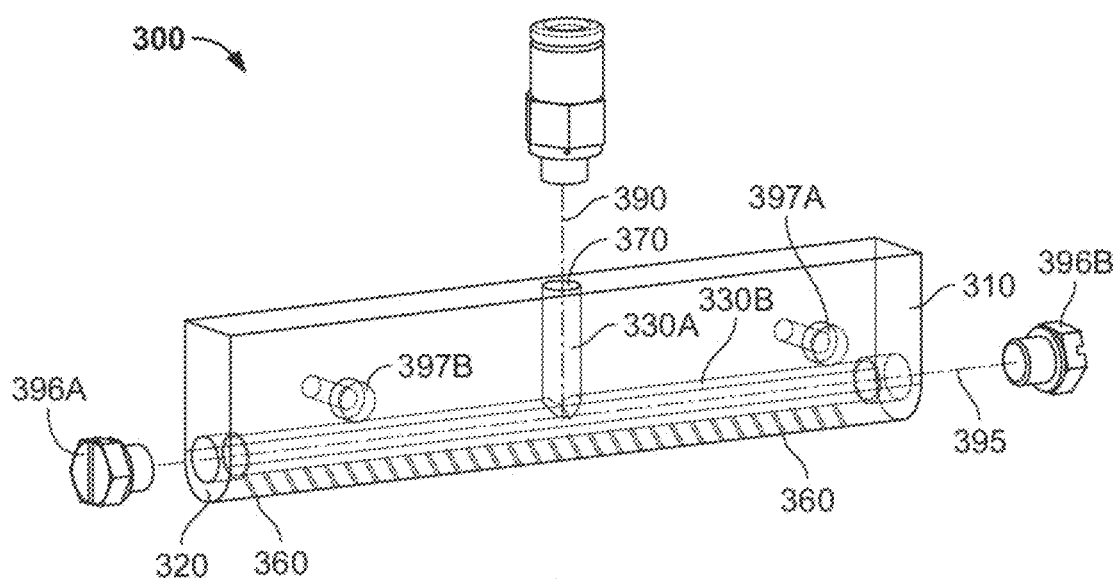
FIG. 3 illustrates an isometric view of a gas knife according to another embodiment of the present disclosure.

With reference to FIGS. 1, 2, and 3, the gas knife 300 may comprise a plenum 330B having plurality of outlets 360 in fluidic communication with the plenum 330B. In some embodiments, the plenum 330B is in fluidic communication with an inlet 370 by means of a conduit 330A. In this way, a gas stream entering through the inlet 370 may flow through the conduit 330A and into the plenum 330B, where it is distributed to each of the individual gas outlets 360 and expelled.

In some embodiments, the plenum 330B is housed within a body 310 which is configurable for incorporation into a greater structure, e.g. a liquid removal device, fluid dispensing apparatus. The body 310 may include one or more mounting or attachment points 397A and 397B such that the gas knife 300 may be removably incorporated into a liquid removal device or other means capable of moving the gas knife 300 relative to a microscope slide (e.g. a transporter, a movable fluid dispensing device). The gas knife may include optional ports 396A and 396B such that the gas knife 300 may be in fluidic communication with other devices, gas sources, pressure relief valves, etc.

In some embodiments, the bottom end of the gas knife is rounded, although in other embodiments the bottom end 320 may be squared off or may comprise a beveled edge. In some embodiments, the gas knife 300 has a size as measured across its longitudinal axis 395 that approximates the length of a microscope slide, e.g. about 3 inches (7.62 cm) in length.

Figure 6A:
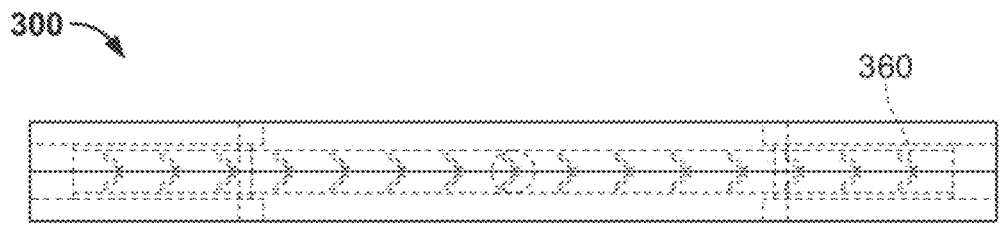
FIGS. 6A, 6B, 6C, and 6D illustrate bottom views of a gas knife employing multiple rows of gas outlets.
Figure 6B:
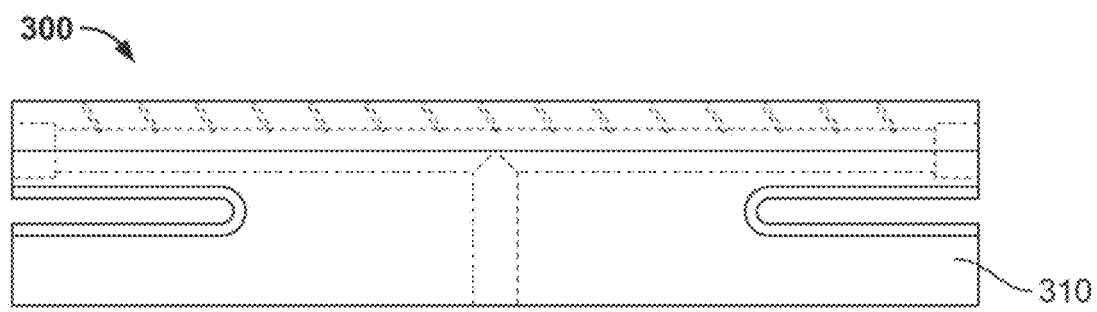
Figure 6C:
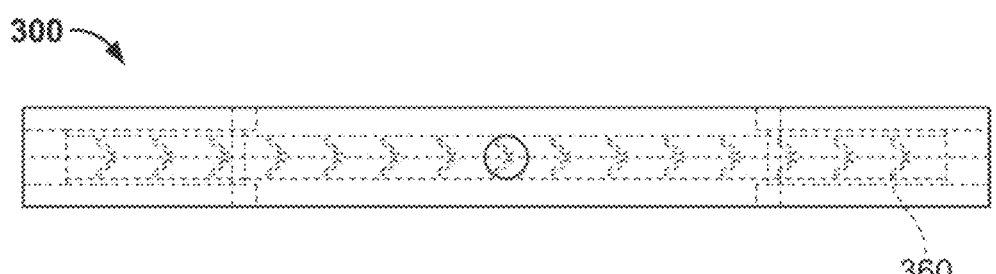
Figure 6D:
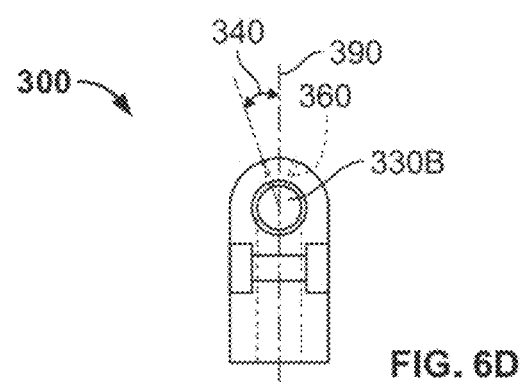

In some embodiments, and with reference to at least FIGS. 4A, 4C, 5A, and 5C, the plurality of outlets 360 are arranged along an end 320 of the gas knife 300. In some embodiments, the plurality of outlets are arranged along a line which runs substantially parallel to a longitudinal axis of the gas knife 395. In some embodiments, the plurality of outlets 360 are arranged in a single row. In other embodiments, the plurality of outlets 360 arranged are arranged in two or more rows (see, e.g., FIGS. 6A and 6C). In some embodiments, the outlets 360 may be arranged parallel to each other, such as depicted in FIGS. 6A, 6B, and 6C. In other embodiments, the outlets 360 may be arranged in a staggered configuration (not depicted).

The skilled artisan will appreciate that there exist many variables which may determine the flow rate of gas through any individual gas outlet 360, including the size, shape, and pitch, not to mention the gas pressure supplied to the plenum. In some embodiments, the plurality of outlets 360 are provided at a pitch of between 3 and 20 outlets per inch (2.54 cm). In other embodiments, the plurality of outlets 360 are provided at a pitch of between 5 and 15 outlets per inch (2.54 cm). In other embodiments, the plurality of outlets 360 are provided at a pitch of between 8 and 12 outlets per inch (2.54 cm). In other embodiments, the plurality of outlets 360 are provided at a pitch of about 10 outlets per inch (2.54 cm).

Without wishing to be bound by any particular theory, it is believed that such spacing of the outlets results in a shorter distance being required from the outlet array in order to achieve a continuous curtain. In the presently disclosed design, the adjacent gas streams do not begin to overlap until they are about 0.1 inches (0.254 cm) away from the outlets, and the flow becomes approximately continuous about 0.15 inches (0.381 cm) from the outlets. In some embodiments, target spacing between the gas knife and the substrate slide is at least 0.210 inches (0.5334 cm), by which distance the character of the air curtain as it impinges on the slide is quite uniform. If spacing is increased, it is believed that the distance required to achieve uniform flow profile would also increase. Again, without wishing to be bound by any particular theory, it is believed that if the spacing becomes very large, then it is possible that the individual air jets would never combine before the air reaches the target surface, or that there might be large variations in the gas velocity profile along the length of the air curtain.

In some embodiments, the plurality of outlets are evenly spaced from one another. For example, considering an outlet having a circular opening, the outlets 360 may be spaced from about 0.05 inches (0.127 cm) to about 0.2 inches (0.508 cm) apart from each other, as measured from the center of one circular opening to the center of another circular opening. In another example, and again assuming circular openings, the outlets 360 may be spaced from about 0.05 inches (0.127 cm) to about 0.15 inches (0.381 cm) apart from each other. In yet another example, and again assuming circular openings, the outlets 360 may be spaced from about 0.1 inches (0.254 cm) apart from each other. Of course, the skilled artisan will appreciate that the outlets 360 may have any geometric shape, e.g. circular, ovoid, rectangular, square, etc.

In some embodiments, the outlets 360 have a diameter ranging from about 0.006 inches (0.01524 cm) to about 0.018 inches (0.04572 cm). In other embodiments, the outlets 360 have a diameter ranging from about 0.008 inches (0.02032 cm) to about 0.016 inches (0.04064 cm). In yet other embodiments, the outlets 360 have a diameter of about 0.012 inches (0.03048 cm). The skilled artisan will appreciate that the outlets 360 may each have the same or different diameters. In some embodiments, the outlets 360 have a length ranging from about 0.03 inches (0.0762 cm) to about 0.18 inches (0.4572 cm). In other embodiments, the outlets 360 have a length ranging from about 0.05 inches (0.127 cm) to about 0.15 inches (0.381 cm).

In some embodiments, a ratio of the length of the outlet 360 to the diameter of the outlet (referred to herein as the "L/D ratio") 360 is at least 5. In other embodiments, the ratio is at least 6. In other embodiments, the ratio is at least 7. In other embodiments, the ratio is at least 8. In other embodiments, the ratio is at least 9. In other embodiments, the ratio is at least 10.

Without wishing to be bound by any particular theory, it is believed that the L/D ratio helps to establish the momentum of the outlet air stream in a direction aligned with the axis of the channel transporting the gas from the plenum chamber to the environment. It is believed that for small values of L/D, the divergence of the air stream is high; for large values, the divergence of the gas column is lower. Thus, the greater the value of L/D, the more "collimated" the jet of gas is believed to be. However, the benefit of collimation must be weighed against the energy cost of drag within the drilled hole, which drag increases approximately linearly with the length, so very high L/D ratios provide diminishing improvements. One useful aspect of the multi-nozzle design of the present disclosure is that once adjacent columns merge, the divergence of each gas stream diminishes essentially becoming more collimated after the jets combine.

Figure 7:
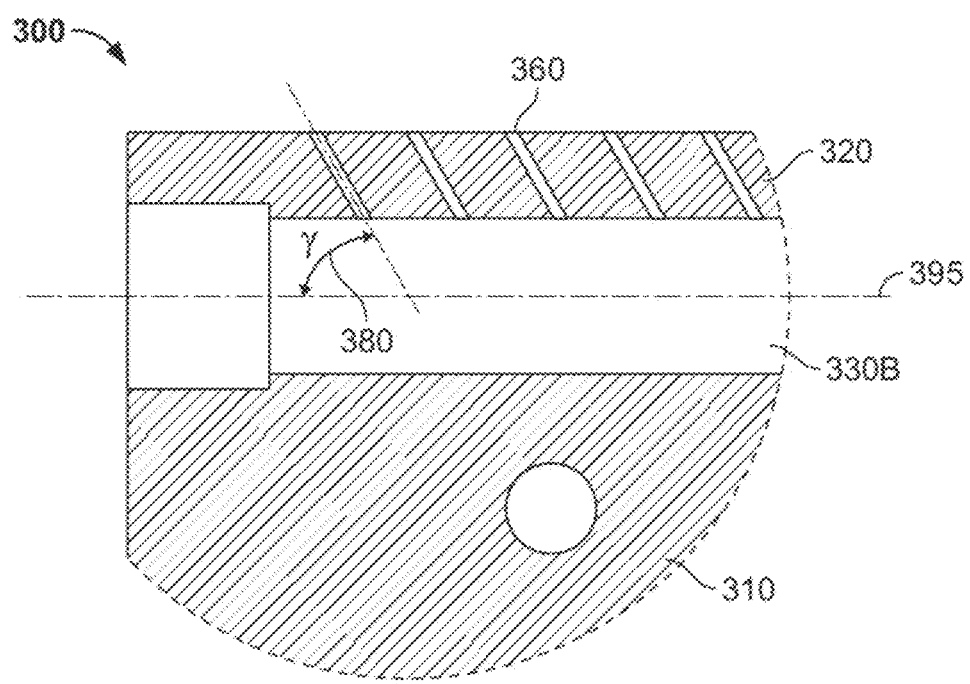
FIG. 7 illustrates a cross-sectional view of a gas knife having a slant angle of about 30 degrees.

The gas outlets may be provided at various angles such that gas flow may be directed as desired. With reference to FIGS. 1 and 2, two such angles are a tilt angle and a slant angle. In general, a "tilt angle" refers to a positioning of the gas outlets on the bottom end 320 of the gas knife 300 relative to a line 390 along an axis perpendicular to the longitudinal axis of the gas knife, i.e. the tilt angle is the angle of the center of the gas curtain plane with respect to the substrate normal (see, FIG. 1). On the other hand, a "slant angle" refers to an angle in which the gas outlet is formed in the body 310 relative to the longitudinal axis of the gas knife, i.e. the slant is the angle that the centerlines of the nozzles make within the curtain plane, with respect to the long axis of the plenum chamber (see, FIGS. 2 and 7).

Figure 5A:
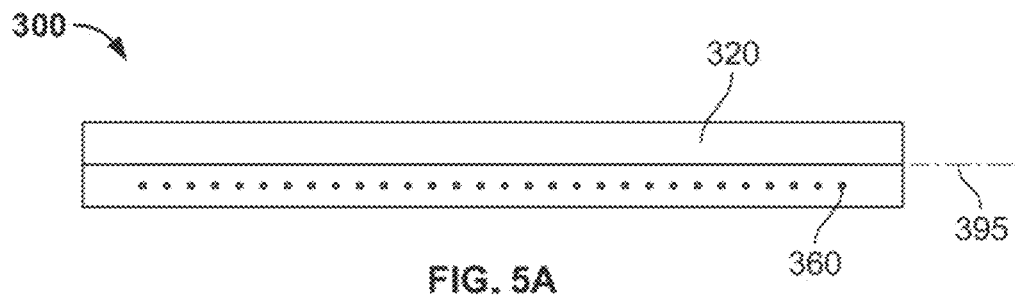
FIGS. 5A, 5B, and 5C illustrate a gas knife having a tilt angle of about 30 degrees.
Figure 5B:
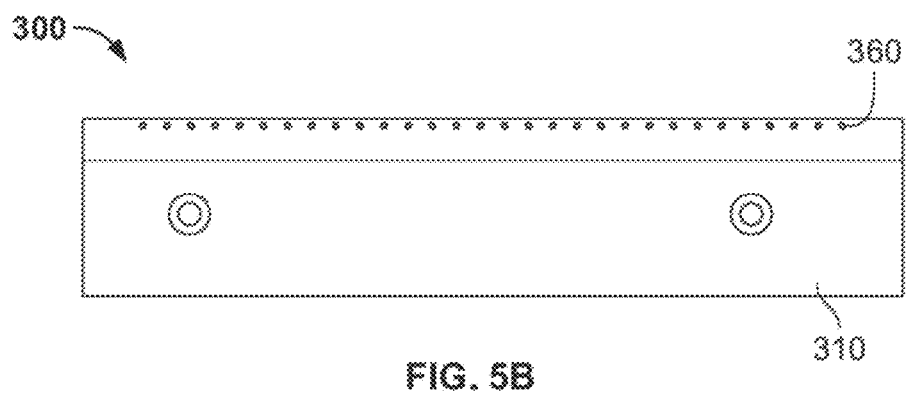
Figure 5C:
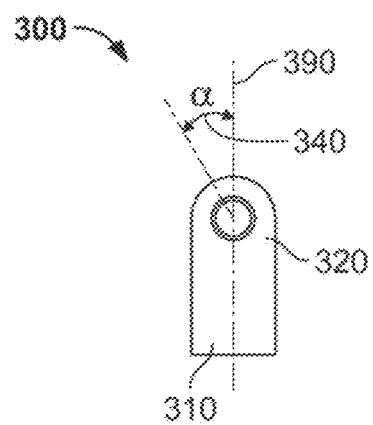

In some embodiments, and with reference to FIGS. 1 and 5B, the outlets 360 are configured to have at a tilt angle 340 relative to a line 390 of the gas knife 300. In some embodiments, the tilt angle 340 ranges from between about 0 degrees to about 60 degrees. In some embodiments, the tilt angle 340 ranges from between about 5 degrees to about 50 degrees. In some embodiments, the tilt angle 340 ranges from between about 10 degrees to about 50 degrees. In some embodiments, the tilt angle 340 ranges from between about 15 degrees to about 45 degrees. In some embodiments, the tilt angle 340 ranges from between about 15 degrees to about 40 degrees. In some embodiments, the tilt angle 340 ranges from between about 15 degrees to about 35 degrees. In some embodiments, the tilt angle 340 ranges from between about 20 degrees to about 35 degrees. In some embodiments, the tilt angle 340 ranges from between about 25 degrees to about 35 degrees. In some embodiments, the tilt angle 340 is about 45 degrees. In some embodiments, the angle 340 is about 30 degrees. In some embodiments, the tilt angle 340 is about 15 degrees. In some embodiments, the tile angle 340 is about 0 degrees. FIGS. 6A, 6B, and 6C illustrate a gas knife 300 where the plurality of outlets 360 are offset at a tilt angle of about 30 degrees.

Figure 4A:
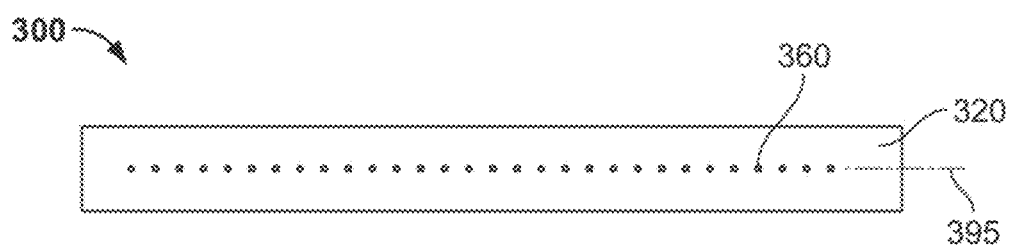
FIGS. 4A, 4B, and 4C illustrate a gas knife having a tilt angle of zero.
Figure 4B:
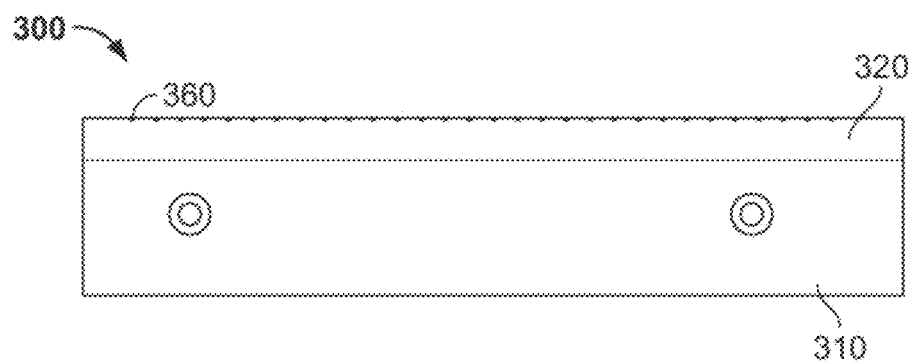
Figure 4C:
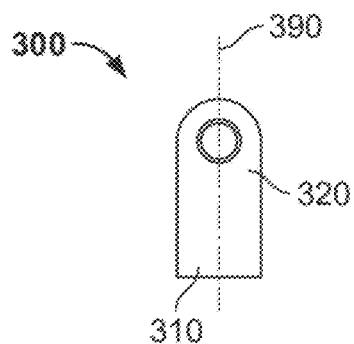

In some embodiments, and with reference to FIGS. 2, 3, and 4B, the outlets are configured to have a slant angle 380 relative to the longitudinal axis 395 of the gas knife 300. In some embodiments, the slant angle 380 ranges from about 0 degrees to about 70 degrees. In some embodiments, the slant angle 380 ranges from about 0 degrees to about 60 degrees. In some embodiments, the slant angle 380 ranges from about 5 degrees to about 50 degrees. In some embodiments, the slant angle 380 ranges from about 5 degrees to about 40 degrees. In some embodiments, the slant angle 380 ranges from about 10 degrees to about 45 degrees. In some embodiments, the slant angle 380 ranges from about 10 degrees to about 40 degrees. In some embodiments, the slant angle 380 ranges from about 15 degrees to about 45 degrees. In some embodiments, the slant angle 380 ranges from about 20 degrees to about 40 degrees. In some embodiments, the slant angle 380 ranges from about 25 degrees to about 35 degrees. In some embodiments, the slant angle 380 is about 35 degrees. In some embodiments, the slant angle 380 is about 30 degrees. In some embodiments, the slant angle 380 is about 25 degrees. In some embodiments, the slant angle 380 is about 20 degrees.

In some embodiments, the inlet 370 is configured to receive a pressurized gas from an external gas source (e.g. a pump, an air compressor, a blower, a fan, or other means sufficient to pressurize a gas from a gas source, if not already sufficiently pressurized). In some embodiments, the flow rate of a gas passing through the inlet 370 ranges from about 10 L/min to about 20 L/min. In other embodiments, the flow rate of a gas passing through the inlet 370 ranges from about 11.5 L/min to about 12.5 L/min.

It is believed that the flow rates through individual nozzles are approximately equal, since this is a choked flow configuration (see herein) in which the tolerances on both diameter and length of the holes are tightly controlled, and the total outlet cross sectional area is significantly smaller than the manifold cross-sectional area. In the case of inlet flow equal to about 10 L/min to about 20 L/min, the outlet flow per nozzle would be about 10/30=about 0.33 L/min, through about 20/30=about 0.67 L/min.

This outlet flow rate increases as entrained air from the surrounding environment is drawn into the gas stream, amplifying the total flow rate by a factor ranging from about three to about 15 times, depending on the internal pressure and the distance from the outlet.

The skilled artisan will appreciate that the pressurized gas provided at inlet 370 will be distributed through the plenum 330B and to each gas outlet 360. Because the size of each gas outlet 360 is relatively small compared to the size of the inlet (as noted above) (and thus the volume of air entering the inlet is greater than a volume which may flow through the outlets at any given time), a "choked flow" results. Choked flow is a phenomenon that limits the mass flow rate of a compressible fluid flowing through nozzles, orifices and sudden expansions. Generally, it is the mass flux after which a further reduction in downstream pressure will not result in an increase in mass flow rate. The skilled artisan will appreciate that as a compressible fluid (here a compressible gas) reaches the speed of sound, pressure changes can no longer be communicated upstream as the speed of which these pressure changes are propagated is limited by the speed of sound. In a nozzle or restriction (here, a plurality of gas outlets) this has the effect of isolating the upstream side from the downstream side at the throat. Because of this effect any reduction in downstream pressure will have no effect on the flow rate, as the increased pressure differential is not 'felt' upstream of the restriction.

In some embodiments, the choked flow through the nozzles drilled in the gas knife exits the air knife at a speed that is close to Mach 1. When this exit gas hits the slow-moving air surrounding the air knife, energy and momentum are transferred to air that becomes entrained in the air curtain. It is believed that it is this mechanism by which the discrete jets of air combine to form a continuous air curtain at a characteristic distance from the exit ports. The volume of air flow increases dramatically as the velocity of the air decreases.

Figure 8A:
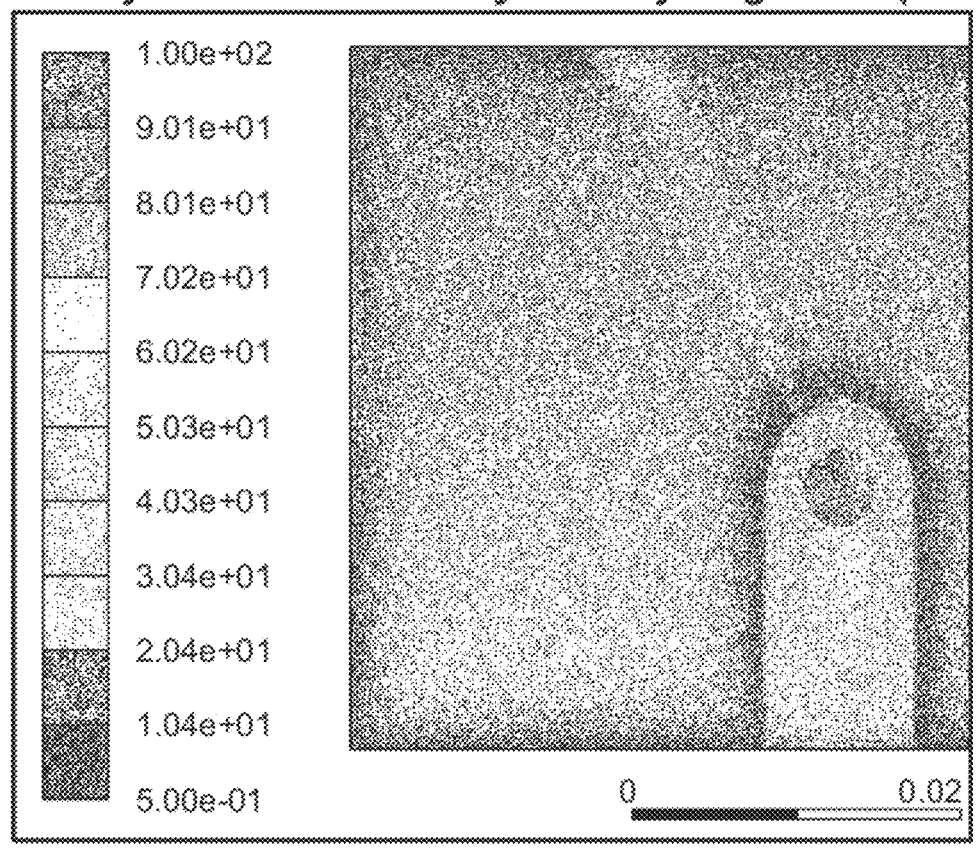
FIGS. 8A, 8B, and 8C illustrate the formation of a gas curtain and the flow rate of the formed gas curtain.
Figure 8B:
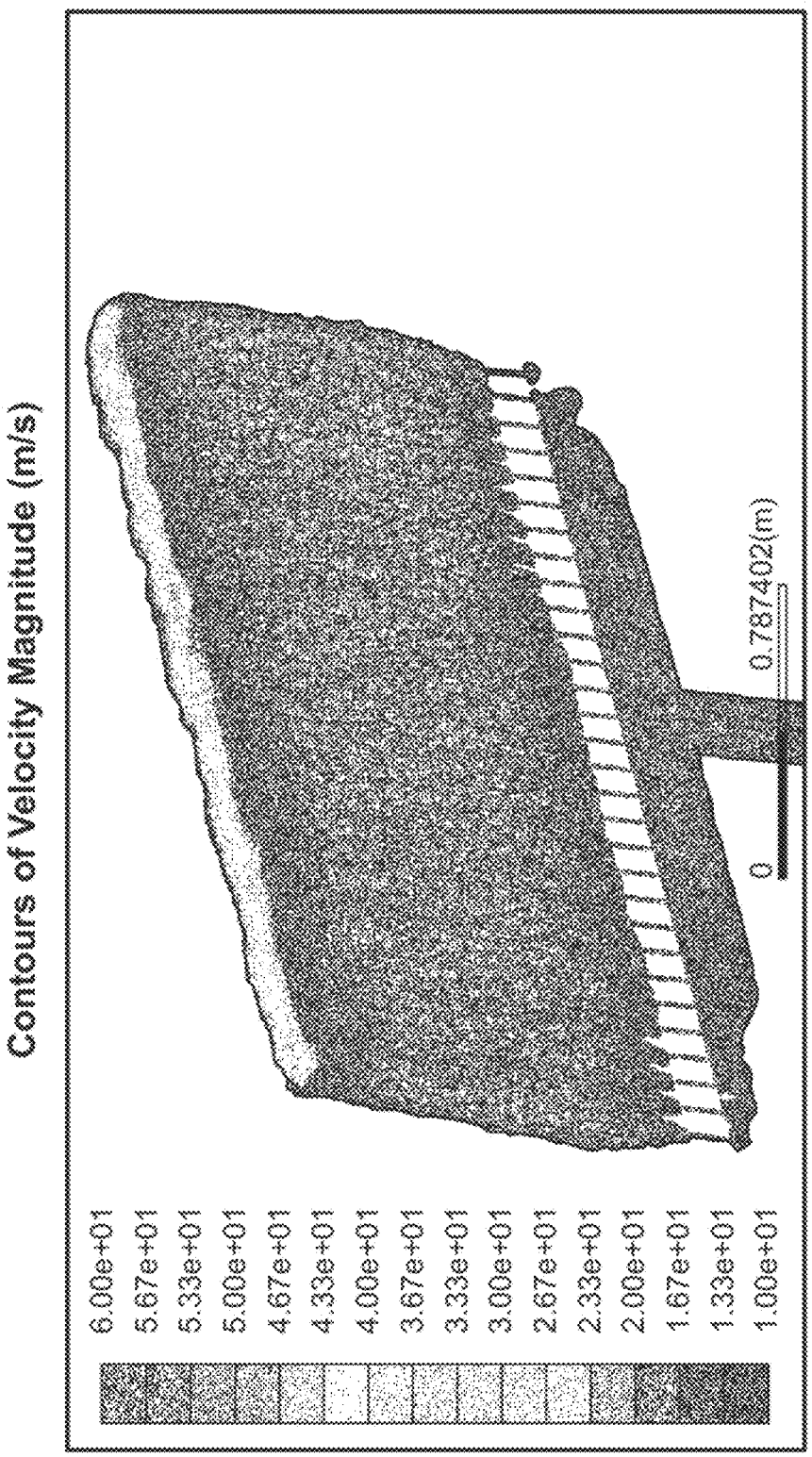
Figure 8C:
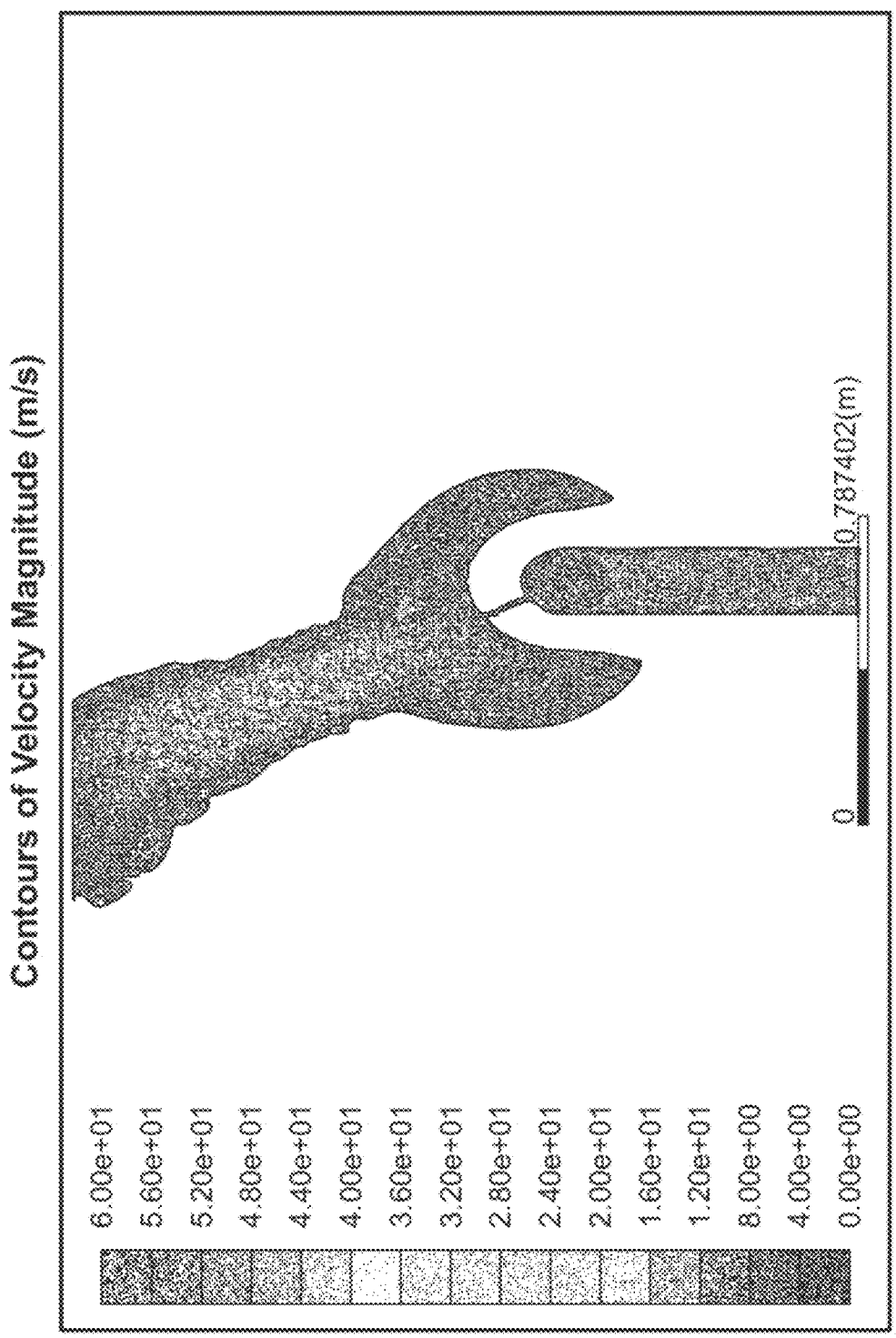

As a result of the choked flow through the gas knife, the gas flow rate between any two discrete gas outlets 360 is substantially the same, i.e. the flow rate between any two discrete outlets 360 does not vary by more than about 10%, and in some embodiments, does not vary by more than about 7.5%, and in further embodiments does not vary by more than about 5%. In some embodiments, a gas curtain is produced from the merging of the individual gas flows or streams from each outlet 360. In some embodiments, the gas curtain is substantially uniform (see, e.g., FIGS. 8A, 8B, and 8C).

Figure 9A:
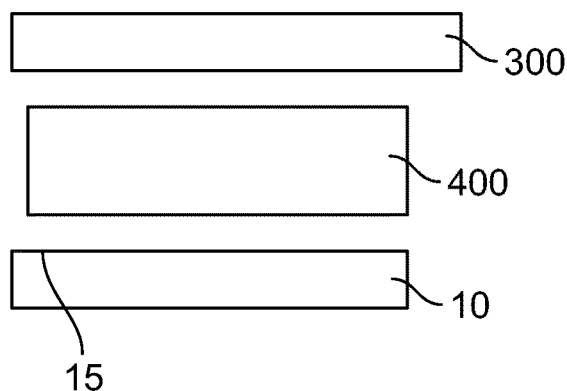
FIG. 9A illustrates a frontal view of rectangular gas curtain formed from a gas knife and positioned over a slide.
Figure 9B:
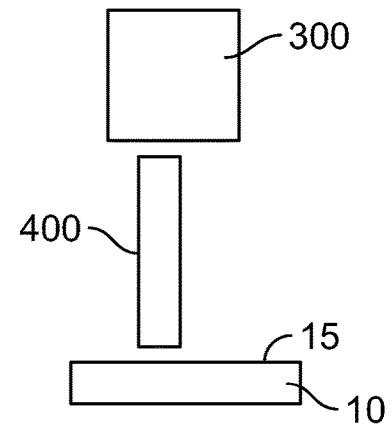
FIG. 9B illustrates a side view of a gas curtain projected from a gas knife positioned over a slide, the gas knife configured have a tilt angle of zero degrees.

In some embodiments, the gas curtain formed has a general shape which, in part, is dictated by the design of the components of the air knife. Indeed, the skilled artisan will appreciate that the slant angle 380 and tilt angle 340 (alpha angle) will contribute to the shape of the gas curtain. For example, a gas knife 300 employing outlets 360 having a tilt angle of 0 degrees and a slant angle of 0 degrees will produce a gas curtain having a shape roughly approximating that of a rectangle 400, such as depicted in FIG. 9A. Assuming a slide 10 positioned under the gas knife, the plane of the roughly rectangular gas curtain would be normal to the upper surface 15 of the slide 10, i.e. perpendicular to the plane of the upper surface of the slide (see, FIG. 9B).

Figure 9C:
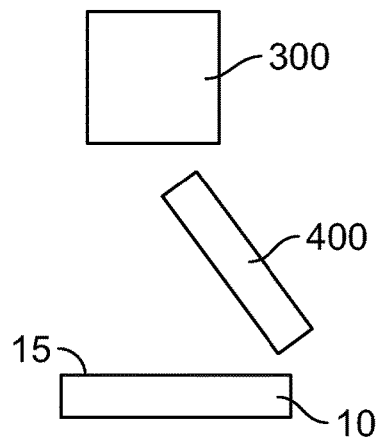
FIG. 9C illustrates a side view of a gas curtain projected from a gas knife positioned over a slide, the gas knife configured have a tilt angle of about 30 degrees.

On the other hand, a gas knife 300 employing outlets having a tilt angle of 30 degrees and a slant angle of 0 degrees, produces a gas curtain that, while also roughly approximating that of a rectangle 400, has an angle of incidence of about 30 degrees relative to the upper surface 15 of the slide 10, and thus offset from the normal (see FIG. 9C).

Figure 9D:
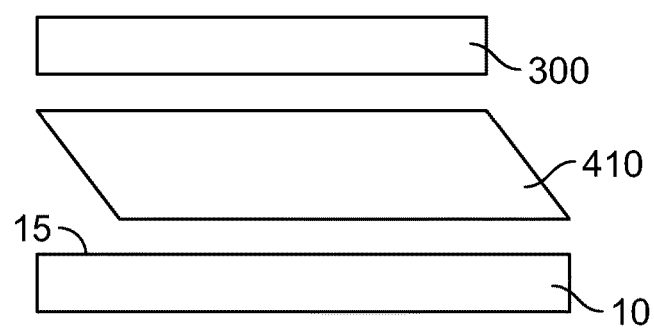
FIG. 9D illustrates a frontal view of parallelogram-shaped gas curtain formed from a gas knife and positioned over a slide.

In some embodiments, the gas knife is configured such that a gas curtain produced therefrom roughly approximates the shape of a parallelogram. For example, a gas knife 300 employing outlets having a tilt angle of 0 degrees and a slant angle of about 30 degrees will produce a gas curtain having a shape roughly approximating that of a parallelogram 410, such as depicted in FIG. 9D. Like the rectangular gas curtain depicted in FIG. 9B, and again assuming a slide positioned under the gas knife, the plane of the parallelogram gas curtain would be normal to the upper surface 15 of the slide 10. As will be appreciated by the person of ordinary skill in the art, while the parallelogram gas curtain and the rectangular gas curtain may both be in a plane normal to the surface of the slide, the parallelogram gas curtain, by virtue of the slant angle, possesses a translational momentum having a vector component 420 which is parallel to the longitudinal axis of the gas knife 395 (see FIG. 9E). This vector component which is parallel to the longitudinal axis of the gas knife can impart a flow generally parallel to the longitudinal axis of the gas knife 395 to any substance under the gas knife and along a line perpendicular to the plane of the gas curtain (referred to herein as "parallelogram flow").

This concept may be visualized by the following example. Assume for instance a stationary gas knife positioned over a substrate having water on its surface and assume that the gas knife is configured such that a slant angle is about 30 degrees (relative to the longitudinal axis of the gas knife 395). When the plenum is pressurized and the flow of gas through the outlets 360 merge to form a gas curtain, the gas curtain will have a roughly parallelogram shape 410. This parallelogram-shaped gas curtain comprises a component 420 which, when directed to the water on the slide will push the fluid on the surface of the slide in direction along the slide's longitudinal axis (see, FIG. 9E).

Figure 9E:
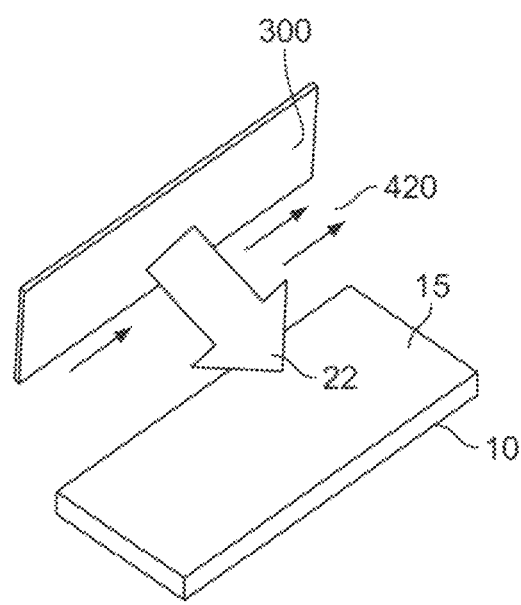
FIG. 9E sets forth an isometric view of parallelogram-shaped gas curtain formed from a gas knife and positioned over a slide.

When the gas knife in the above example is moved in a direction 22 that is perpendicular to the above-referenced longitudinal axis of the slide, the skilled artisan will appreciate that the water on the slide's surface may be moved along a processing pathway that is along a vector imposed by the movement of the entire flow field in one direction 22 (e.g. along an x-axis) and the momentum of the gas particles in a perpendicular direction 420 (e.g. along a y-axis) (see FIG. 9E). Indeed, the skilled artisan will appreciate that the entire flow field may act like a planar blade which impinges the slide surface and pushes the water along the x-axis while the momentum of the gas particles in the gas stream imparts movement along the y-axis which, when considered together, urges movement of water along a processing pathway which is the vector sum of the x- and y-axis moments. The effect of parallelogram flow and its use in directing fluids on the surface of a microscope slide are discussed further herein.

In some embodiments, gas knife or any portion thereof is produced directly by machining or milling a block of solid material. In some embodiments, the gas knife or any portion thereof is produced by 3D printing. In other embodiments, the gas knife or any portion thereof is produced from a mold.

In some embodiments, the entire gas knife is formed from a single machined, milled, or molded piece. In some embodiments, the gas outlets are drilled into a molded or machined casing of the gas knife.

The gas knife may be fabricated from any material. For example, the gas knife, or any constituent part thereof, may be made from a plastic (e.g. derived from a polymer, a copolymer, or a polymer or co-polymer blend), rubber, ceramic, glass, silicon, or metal. Non-limiting examples of plastics include, without limitation, acrylonitrile butadiene styrene (ABS), polyetheretherketone (PEEK), polyurethane, polyester, polypropylene, or combinations thereof.

Methods of Removing Fluids from a Surface with a Gas Knife

Also disclosed are methods of directing fluid on the surface of a substrate using the exemplary embodiments of the gas knife described herein. In some embodiments, the method includes disposing a gas knife relative to a surface of a substrate, moving the gas knife or the substrate in a first direction, and directing a gas curtain from the air knife onto the substrate as the gas knife or the substrate is moved.

In some embodiments, the gas knife disclosed herein is adapted to contactlessly urge fluid on a surface of a microscope slide from an initial position, along a series of intermediate positions, and to a final position, e.g. from an initial position on the surface of the slide towards at least one of a wicking feature or a longitudinal edge of the slide. In some embodiments, a gas knife is configured such that it pushes fluid into a puddle that rides along a longitudinal edge of the slide, e.g. from bottom to top, when the puddle reaches the top, the puddle encounters a feature, namely a wicking feature, that provides wicking contact. Without wishing to be bound by any particular theory, it is believed that the disclosed process applies low forces to any fluid on the slide; yet the process is able to proceed at a high speed when compared to prior gas knife designs.

Figure 10A:
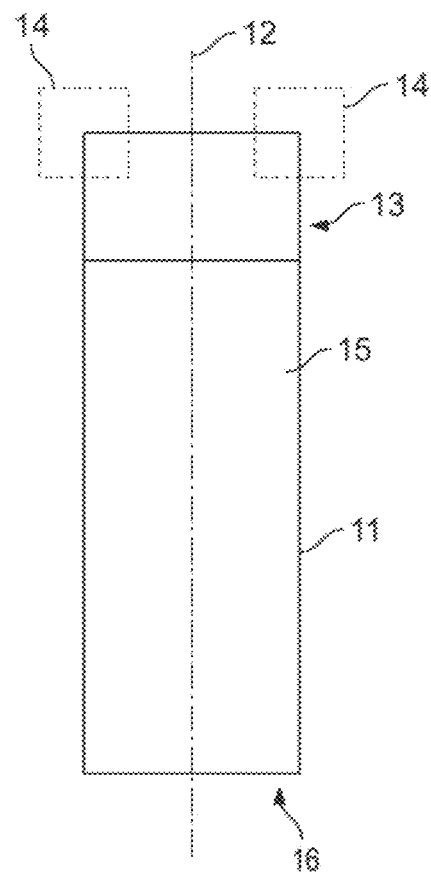
FIG. 10A is a top view of a microscope slide showing wicking features in communication with one end of the slide.
Figure 10B:
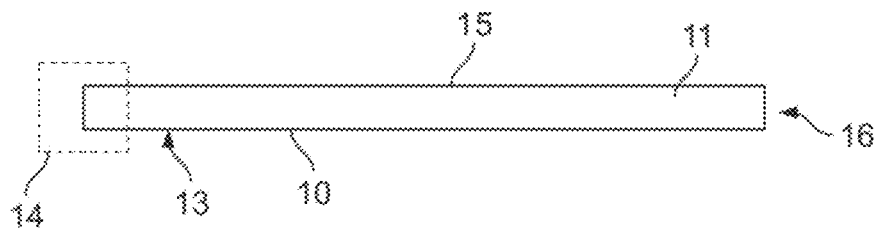
FIG. 10B is a side view of a microscope slide showing a wicking feature in communication with a corner of the slide.

A microscope slide 10 is depicted in FIGS. 10A and 10B. The microscope slide 10 comprises an upper surface 15 where the upper surface may comprise a biological specimen. A coverslip (not depicted) may be overlaid on top of the upper surface 15 and therefore over any biological specimen deposited thereon. When referring to the movement or removal of fluids from an upper surface of a slide as noted herein, it is meant that (i) fluids (or residual fluids) may be at least partially removed from the upper surface 15 of the slide, (ii) fluids may be at least partially removed from a specimen located on the upper surface 15 of the slide, and/or (iii) fluids may be removed from an upper surface of a coverslip and/or from around the edges of a coverslip, the coverslip provided on an upper surface of the slide.

The microscope slide 10 comprises longitudinal edges 11A and 11B and a longitudinal axis 12. The microscope slide 10 may have a first end 13 (also referred to herein as a "top end" or a "label end"); and may also have a second end 15 (sometimes referred to as a "specimen bearing end" or the like). At one of the first or second ends, one or more wicking features 14A and 14B may be incorporated. The wicking features 14A and 14B may contact the upper surface 15 of the slide 10 (see, e.g., FIG. 10A) and/or may contact a vertical edge of the slide (see, e.g. FIG. 10B).

In some embodiments, the wicking feature aids in facilitating the removal of a fluid from the slide, such as by drawing the fluid toward it through capillary action. In some embodiments, the wicking feature is any element that may geometrically establish at least two surfaces near enough to each other such that a gap created allows capillary flow of fluid from one region to another. In some embodiments, the wicking feature is a member that holds the microscope in position within a tray. In some embodiments, the wicking feature is a retaining clip or a slide clip. In some embodiments, the wicking feature is comprised of a material that enhances capillary action. For example, the material may be an absorbent material, including materials comprising synthetic and/or natural fibers (e.g. cotton, felt, sponge, etc.). In some embodiments, the wicking feature may be in communication or contact with a waste collection member, channel, or basin.

As noted herein, the gas knife may be configured to produce a gas curtain, such as a substantially uniform gas curtain, that facilitates the movement of fluids accumulated on the upper surface 15 of a slide. In some embodiments, the gas knife, or gas curtain discharged therefrom, has a size which approximates the length of a slide. For example, the gas knife may discharge a gas curtain having a flow field that substantially approximates the longitudinal length of the slide. In other embodiments, the gas knife may discharge a gas curtain having a flow field that extends across the majority of the length of the slide. In yet other embodiments, the gas knife may discharge a gas curtain having a flow field which is larger than the longitudinal length of the slide. In this way, as the gas knife moves across the slide, fluids 24A and 24B present at any location on the surface of the slide may be urged toward a wicking feature 14A or 14B and/or a longitudinal edge of the slide 11A or 11B.

Figure 11C:
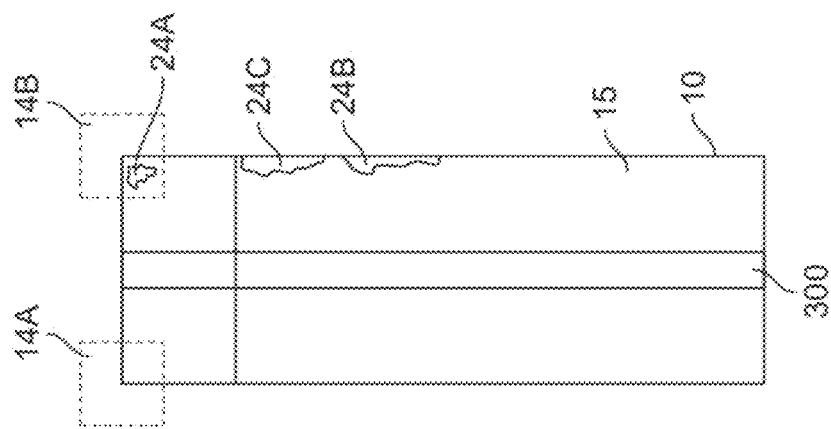
FIGS. 11A, 11B, and 11C illustrate the movement of a fluid across a slide using a gas knife according to the present disclosure.
Figure 11B:
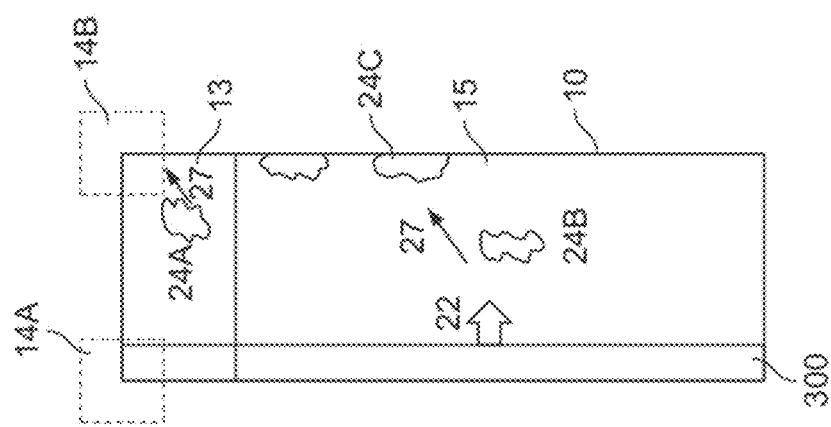
Figure 11A:
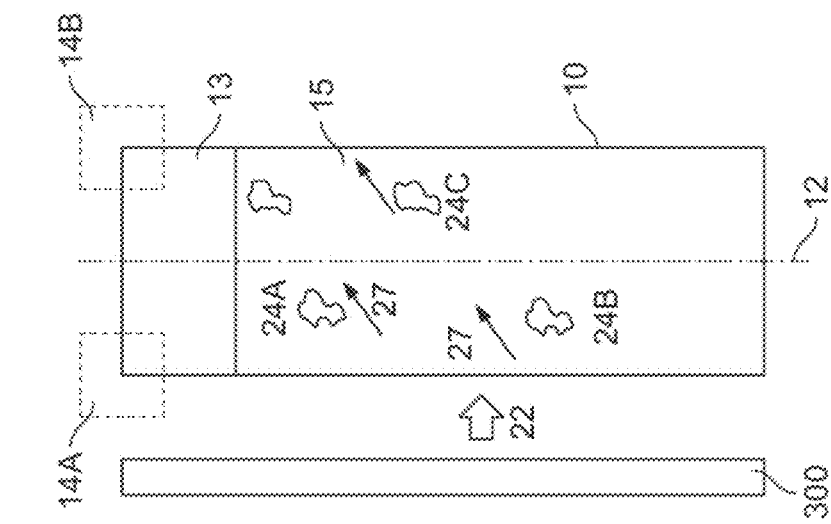

FIGS. 11A, 11B, and 11C illustrate the motion of a gas knife 300 relative to a slide and the effect the gas curtain discharged from the gas knife 300 has on fluids 24A and 24B located on the upper surface 15 of slide 10 as the gas knife moves from an initial position to a final position. As depicted in at least these figures, the gas knife 300 may move in a direction substantially perpendicular 22 to the longitudinal axis 12 of the slide. By "substantially perpendicular to the longitudinal axis of the slide" it is meant that the movement of the gas knife does not deviate by more than 5% from a direction that is perpendicular to the longitudinal axis of the slide. In other embodiments, the gas knife moves in a direction that is offset relative to a line perpendicular to the longitudinal axis of the slide, such as offset at an angle ranging from between about 5 degrees to about 60 degrees.

FIG. 11A illustrates a gas knife 300 at an initial position, such as a position located proximal a first longitudinal edge 11A of slide 10. Once the gas knife is pressurized and the gas knife begins moving in a direction 22, fluids 24A and 24B will be urged along a processing path 27 (FIG. 11B). As noted herein, the processing path is based on the cumulative effect of (i) the movement of the gas knife relative to the slide, (ii) the angle at which the gas curtain intercepts the surface of the slide (e.g. as dictated by the tilt angle 340), and (iii) the shape of the gas curtain (e.g. as dictated by the slant angle 380). In one particular embodiment, as a gas knife having a tilt angle of zero and a slant angle of about 30 degrees is moved along direction 22, the fluids 24A and 24B will advance roughly along processing pathway 27 toward at least one of a wicking feature 14B or a longitudinal edge 11B.

Once the fluid 24B reaches the wicking feature (FIG. 11C), it is drawn towards the wicking feature and away from the slide, such as by capillary action, and hence is removed from the slide. Fluid, such as fluid 24B, which reaches a longitudinal edge 11B, may remain on the slide and may continue to travel along the longitudinal edge 11 of the slide 10 as the gas knife 300 continues to advance across the slide along direction 22. Without wishing to be bound by any particular theory, it is believed that when fluid (e.g. 24B) reaches the longitudinal edge 11B, a surface tension of the fluid may help keep the fluid on the upper surface 15 of the slide 10. In some embodiments, the longitudinal edges of the slide are local proximal waste collection members or channels, in the event that fluid is directed from the longitudinal edge of the slide.

Once the gas knife 300 has completed its movement across the slide, it may stop at a location proximal a longitudinal edge 11B of the slide. In some embodiments, the process described above may be repeated by moving a gas knife 300 from a location proximal to the longitudinal edge 11B and in a direction opposite direction 22, but again substantially perpendicular to the longitudinal axis 12 of slide 10. In this way, any fluid remaining on the slide after the "first pass" of the gas knife may be directed towards a wicking feature 14A or a longitudinal edge 11A for removal from the slide.

In some embodiments, the gas knife to be configured may travel across the slide at a rate of greater than about 0.5 inches per second (1.27 cm/second). In other embodiments, the gas knife may travel across the slide at a rate of greater than about 0.6 inches per second (1.524 cm/second). In yet other embodiments, the gas knife may travel across the slide at a rate of greater than about 0.7 inches per second (1.778 cm/second). In further embodiments, the gas knife may travel across the slide at a rate of greater than about 0.8 inches per second (2.032 cm/second). In yet further embodiments, the gas knife may travel across the slide at a rate of greater than about 0.9 inches per second (2.286 cm/second). In even further embodiments, the gas knife may travel across the slide at a rate of greater than about 1 inch per second (2.54 cm/second).

In some embodiments, a gap height between the lower surface of the air knife and the upper surface of the slide is at least 0.1 inches (0.254 cm). In other embodiments, a gap height between the lower surface of the air knife and the upper surface of the slide is at least 0.2 inches (0.508 cm). In yet other embodiments, a gap height between the lower surface of the air knife and the upper surface of the slide is at least 0.3 inches (0.762 cm).

The skilled artisan will appreciate that the gas flow rate, the velocity of the gas knife, and the gap height may be varied so as to fine tune the movement of fluid on the surface of the slide, i.e. to speed up or slow down fluid movement. The skilled artisan will also appreciate that these variables may be altered depending on the type fluid present on the slide. For example, a more viscous fluid may require a higher gas flow rate and a slower gas knife traverse speed as compared with a less viscous fluid. Moreover, the skilled artisan will appreciate that the flow rate and gap height may be altered such that a specimen will not be damaged or that a coverslip will not migrate out of position (see the example provided herein).

The fluid removal process of depicted described above can be performed to remove most or substantially all fluid (e.g. 24A and 24B) on slide 10. In some embodiments, the gas knife 300, in conjunction with the wicking feature, can remove at least 90% of the fluid on the upper surface 15. The skilled artisan will appreciate that the gas knife can also remove volumes of fluid to sustain a maximum residual volume of liquid on the slide 10 at or below a predetermined acceptable volume, such as 30 µL for deparaffinizating liquids, conditioning liquids (e.g., bridging liquids), washing liquids, and stain-differentiating reagents, 20 µL for staining reagents (e.g., hematoxylin reagents), counterstaining reagents (e.g., eosin reagents), and stain-setting reagents (e.g., bluing), and 10 µL to limit or prevent interference with subsequent processing. For example, the maximum residual volume of conditioning fluid can be kept sufficiently low to prevent interference with subsequent coverslipping, enhance handleability, meet archival requirements, and/or limit the release of undesirable fumes.

The skilled artisan will also appreciate that multiple gas knifes may be used in conjunction with each other, such as in tandem, to (i) better facilitate movement of fluids to a wicking feature for removal, and/or (ii) to process fluids over a specimen, e.g. to move a fluid back and forth over a specimen such as to promote diffusion of the fluid, e.g. a reagent, into a specimen mounted on the slide. Likewise, the skilled artisan will appreciate that one or more of the gas knives disclosed herein may be used to remove fluids from multiple slides. For example, a slide tray may comprise a plurality of slides being stained and/or otherwise treated. One or more gas knives may be employed to remove fluids from the surfaces of a plurality of slides within a given slide tray, either simultaneously or sequentially. In some embodiments, a gas knife may be used to remove fluids from specific slides in a slide tray by turning on and off a gas stream to the gas knife as the gas knife is moved over the slides in the slide trade. In this way, fluid can be removed from certain slides without disturbing the fluid present on other slides, including adjacent slides in a slide tray.

Alternatively, one or more gas knives may be brought into place over one or more individual slide processing stations. For example, one or more gas knives may be integrated into an apparatus which includes a plurality of substrate holders where each substrate holder is automatically and independently movable between a different processing position and a different access position. In some embodiments, such an apparatus includes a moveable sample processor configured to simultaneously process two or more substrates held on two or more substrate holders in their different processing positions. Such substrate holders, devices including such substrates holders, and methods of processing are disclosed in U.S. Pat. No. 8,883,509 and in US Publication Nos. 20170023450 and 20150031073, the disclosures of which are hereby incorporated by reference herein in their entireties.

In another embodiment is a method comprising dispensing a fluid on the slide using a fluid dispensing means (e.g. a fluid dispenser), waiting a predetermined period of time, and then using a gas knife to remove at least a portion of the fluid from the slide by urging the fluid to a wicking feature. In some embodiments, the gas knife may be coupled to the fluid dispensing means (e.g. the fluid dispenser). The dispensing of fluid and removal of fluid with a gas knife may be repeated any number of times.

In some embodiments, a fluid dispensing means may be used to deliver a predetermined quantity of a first fluid, e.g. a stain, to a biological sample provided on the surface of the slide. After a predetermined period, the gas knife may be employed to facilitate the movement of the first fluid (or residual first fluid) to a wicking feature. Following removal of the first fluid, a second fluid may be dispensed from the fluid dispensing means, e.g. a wash reagent, and to the slide. Once again, after a predetermined period of time, the gas knife may again be employed to facilitate removal of this second fluid. This process may be repeated any number of times to apply and then remove (with the disclosed gas knife) any number of stains, reagents, washes, buffers, conditioning agents, etc.

By way of a first example, a coverslipping fluid may be applied by a fluid dispensing means, a coverslip applied (which is pre-glued), and then moving excess coverslipping fluid (and/or glue) which has pushed out from the space between the coverslip and the slide with the gas knife.

By way of another example, after a first antibody (or other detection probe) is dispensed and residual first antibody is removed with a gas knife, a first wash fluid may be dispensed. Then, that first wash fluid may be removed from the surface of the slide with the gas knife. Subsequently, a second antibody may be dispensed and again residual second antibody may then be removed with the gas knife. Next, a second was fluid may be dispensed, and then removed with the gas knife. This process, and other fluid dispensing and removal processes, may be repeated any number of times, such as in a multiplex assay.

By way of yet another example, after a first detection probe is dispensed and residual first antibody is removed with a gas knife, a first detection reagent for detecting the first detection probe may be dispensed. Then, that first detection reagent may be removed from the surface of the slide with the gas knife. Of course, wash fluids may be introduced after the removal of the first detection probe but prior to the introduction of the first detection reagents. The wash fluids may be removed with a gas knife prior to introduction of the first detection reagents.

Fluid dispensers and other systems for automated histological processing of biological specimens are disclosed in WO2015/086484, WO2010/080287, and U.S. Pat. No. 7,615,371, the disclosures of which are hereby incorporated by reference herein in their entireties.

Coverslipping Process

In another aspect of the present disclosure is a method of applying a coverslip to a slide, the method comprising performing at least one fluid removal steps, such as with a gas knife according to the present disclosure, prior to curing the coverslipped slide. In some embodiments, the coverslipping process uses a pre-glued coverslip and coverslipping fluid (e.g. an activator solvent). In some embodiments, the solvent is applied to a transformed slide and a coverslip applied to the puddle of applied solvent. Upon contact with the solvent the polymer glue on the bottom of the coverslip begins to dissolve. As the coverslip is applied, a small volume (e.g. about 20 µL to about 30 µL) of solvent ends up on top of the coverslip. This solvent, when dried in an oven, may cause some streaks to be visible. The present method mitigates or prevents the formation of these glue streaks.

Figure 12:
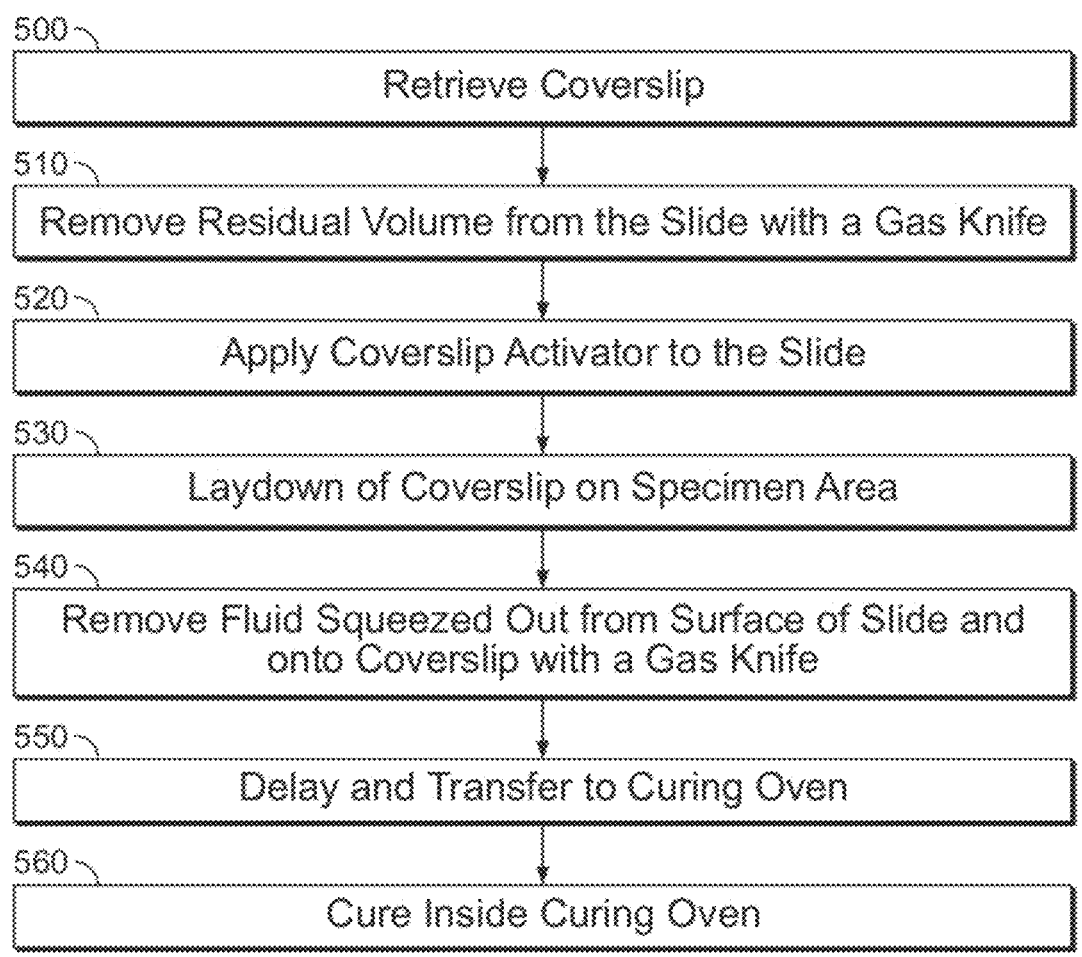
FIG. 12 sets forth a flow chart illustrating the steps of applying a coverslip to a slide according to one embodiment of the present disclosure.

With reference to FIG. 12, a first step in a coverslipping process is the retrieval of a coverslip (step 500). As disclosed in WO2016005347A1, the disclosure of which is hereby incorporated by reference herein in its entirety, coverslips are retrieved one at a time. In some embodiments, the coverslipper apparatus comprises two lifter heads, one for the front row, and one for the back row of slides on the tray. Each lifter head first descends into a coverslip cassette and removes exactly one coverslip which it carries to the slide for eventual laydown on the specimen area, by means of three suction cups, the cups on each head supplied with vacuum from one of two solenoid vacuum pumps inside the coverslipper module (CSM).

Following retrieval of the coverslip, residual volume is removed from the surface of the slide (e.g. residual fluid remaining after staining and/or processing using an upstream apparatus) (step 510). In some embodiments, a gas knife of the present disclosure may be utilized to remove this residual volume. In some embodiments, the gas knife employs parallelogram flow, and fluid is moved at least towards a wicking feature. Of course, any of the gas knife configurations disclosed herein may be used for this purpose.

Next, a coverslip activator fluid is applied to the surface of the slide (step 520). In some embodiments, approximately 45 μL of coverslip activator solution is dispensed as a single drop near the edge of the slide furthest from the label (the "distal end" of the slide).

Next, a coverslip is laid down onto the specimen area of the slide (step 530). In this step, the coverslip is held at an angle of approximately 5 degrees by a single suction cup at the label end of the lifter head, which orientation is called "cantilever mode." The lower end of the coverslip contacts the puddle of activator solvent at the distal end of the slide first, and the solvent meniscus, between the coverslip and the slide, advances up the slide toward the label end, as the lifter head moves down toward the slide. As the lifter head advances downward, the coverslip pushes against the specimen area of the slide. This pressure causes an amount of fluid to be squeezed out onto the top of the coverslip. This process is further described in WO2016005347A1 which, as noted above, the disclosure of which is hereby incorporated by reference herein in its entirety.

Following the laydown of the coverslip (step 540), residual fluid squeezed out on the top of the slide is removed, such as with a gas knife according to the present disclosure. In some embodiments, the gas knife employs parallelogram flow, and fluid is moved at least towards a wicking feature. Of course, any of the gas knife configurations disclosed herein may be used for this purpose. Applicants have surprisingly discovered that timely removal of the fluid squeezed out from the upper surface prevents diffusion of the polymer into the solvent puddles on the top of the slide, such as during an optional delay step 550 (such as described below). In some embodiments, diffusion of the glue into the "squeeze out" can be mitigated by fluid removal process, e.g. one having a period of time of less than 4 minutes, a time period of less than 3 minutes, or a time period of about 2 minutes. By removing the puddle of liquid before diffusion can occur, a reduction or elimination of glue streaking is achieved (see Examples herein).

An optional delay (step 550) is then introduced before curing. This delay is believed to allow the glue to begin to adhere to the specimen area of the slide, to prevent slide migration (which can result in coverslip misalignment) due to rapid high temperature convective air flow inside the curing oven.

Finally, the coverslipped slides are cured in an oven (step 560). This is a high-temperature process in which warm (about 95° C.) air is blown over the slides in the tray, for 5 minutes. The reason this step is performed is to assure that the glue is cured sufficiently to allow immediate handling by the customer after removal from the tray. Since residual fluid squeezed out is removed, glue streaks may be avoided.

At least one embodiment relates to an automated coverslipper for mounting a coverslip on a slide, comprising a module comprising means for applying a coverslip to the surface of a slide, a fluid dispensing means, and a gas knife according to the present disclosure. In some embodiments, the present disclosure is directed to an automated coverslipper for mounting a coverslip on a slide, comprising: (i) at least one coverslip; (ii) at least one slide containing a biological specimen; (iii) at least one lifter head comprising a plate having a bottom surface with at least three individually controlled suction cups arranged thereon, each suction cup being fluidly connected, by way of a gas conduit, to a pneumatics module, which includes a vacuum source, a sensor, and a control-valve for each plumbed gas conduit, the pneumatics module being configured to supply an independent vacuum or pressurized gas to each the suction cup to enable the lifter head bottom surface to perform a cantilever pickup of the coverslip and a cantilever laydown of the coverslip on the slide, or to provide one or more mechanized pulsed movements, or to apply one or more pressurized air bursts; (iv) at least one fluid dispenser coupled to the lifter head and in fluid communication with a fluidics module that supplies a reagent, such as glue or a glue solvent to the fluid dispenser and is configured to dispense fluid on the slide; and (iv) at least one gas knife coupled to the lifter head and in fluid communication with a pneumatics module configured to provide gas to the upper, specimen-bearing surface of the slide; wherein the fluid dispenser and the gas knife are suspended in a substantially vertical position and the lifter head is configured to horizontally move the fluid dispenser and the gas knife over the slide, and the fluid dispenser and the gas knife, are in electrical communication with the control module. In some embodiments, the gas knife is configured such that a gas curtain projected therefrom is angled perpendicular to the upper surface of the slide, and where the gas knife comprises outlets having a slant angle greater than 0 degrees. In some embodiments, the slant angle is between about 10 degrees and about 40 degrees. In one embodiment, a multi-step fluid dispenser and gas knife assisted fluid removal can be employed. In this regard, the coverslipper includes a gas knife which is coupled to, integrated with or merely associated with the lifter head so they will move with or synchronized to move in tandem. In some embodiments, the gas knife is moveable and is attached to a transporter and can be integrated with the fluid dispenser and lifter head. After a coverslipping liquid has contacted the slide for a desired length of time, the gas knife can deliver a gas curtain to the slide such that fluid on the surface of the slide may be urged toward a wicking feature or toward a longitudinal edge of the slide. Additional components of a suitable coverslipper apparatus and methods of using the same are disclosed in WO2016005347A1, the disclosure of which is hereby incorporated by reference herein in its entirety.

EXAMPLES

The following example further illustrates the use of a gas knife having parallelogram flow in the context of a coverslipping process. This example demonstrates that the use of such a gas knife may mitigate the formation of glue streaks and/or gas bubbles. By way of at least this example, Applicants have demonstrated the superiority of coverslipping according to the processes disclosed herein as compared with prior art coverslipping methods.

Background

The coverslipping process uses a pre-glued coverslip and an activator solvent. The solvent is applied to the transformed slide and a coverslip is applied to the puddle of applied solvent. Upon contact with the solvent, the polymer glue on the bottom of the coverslip begins to dissolve. As the coverslip is applied a small volume (about 20 μL to about 30 μL) of solvent ends up on top of the coverslip. Over the course of two minutes, polymer diffuses into the puddle on the top of the slide. After ten minutes, the slides enter into a curing oven where they are exposed to heated airflow to cure the polymer. This airflow spreads the exterior solvent puddles causing the appearance of glue residue streaks on the top surface of the slides.

Objectives

The objective is to develop a gas knife and a procedure for employing the developed gas knife to mitigate glue residue seen on coverslipped slides by at least partially removing puddles on the surface of a coverslip. This example characterizes glue residue and assesses whether other key attributes of the coverslipping process are affected (i.e. tray coverslipping time, bubbles, coverslip alignment, and residual volume).

Methods

The table below shows the experimental factors common to each tray. In addition to the factors listed in the table, a randomized set of 10 slides with 2 labels each and 10 slides with 0 labels were placed in each tray, giving a total of 10 replicates per condition, including number of labels, for each of the conditions listed, for a total of 360 slides. A separate set of 10 replicates, identically configured, were employed in a test of residual volume, totaling an additional 360 slides. Moreover, 200 slides were coverslipped on a Ventana HE 600 to provide baseline information on bubble counts.

| Tray | Air Knife Gap, inches | Air Knife Flow, L/min | Air Knife Traverse Speed, inches/second |
|---|---|---|---|
| 1 | 0.175 | 24 | 0.75 |
| 2 | 0.175 | 24 | 1 |
| 3 | 0.175 | 24 | 1.25 |
| 4 | 0.225 | 24 | 0.75 |
| 5 | 0.225 | 24 | 1 |
| 6 | 0.225 | 24 | 1.25 |
| 7 | 0.225 | 28 | 0.75 |
| 8 | 0.225 | 28 | 1 |
| 9 | 0.225 | 28 | 1.25 |
| 10 | 0.175 | 28 | 0.75 |
| 11 | 0.175 | 28 | 1 |
| 12 | 0.175 | 28 | 1.25 |
| 13 | 0.175 | 32 | 1 |
| 14 | 0.175 | 32 | 0.75 |
| 15 | 0.175 | 32 | 1.25 |
| 16 | 0.225 | 32 | 0.75 |
| 17 | 0.225 | 32 | 1 |
| 18 | 0.225 | 32 | 1.25 |

Tray completion time, transfer fluid volume, coverslip alignment, bubble count and an assessment of residual glue volume were made for each tray.

Results

Tray Completion Time

Tray completion time was measured by reading the timing data log files for each run. It was expected that there would be only one dominant parameter, namely the Traverse Speed. Pre-characterization tests showed that a traverse speed of 1.0 inches per second (2.54 cm/second) allowed the trays to finish in under 300 seconds, a goal of this experiment. Slower traverse speeds resulted in the longest tray completion times, as shown in the table below.

| Tray | Gap, in. | Flow, L/min | Traverse speed, inches/second | RUN# | Tray completion time, sec |
|---|---|---|---|---|---|
| 1 | 0.175 | 24 | 0.75 | 1701 | 303 sec |
| 2 | 0.175 | 24 | 1 | 1702 | 294 sec |
| 3 | 0.175 | 24 | 1.25 | 1704 | 291 sec |
| 4 | 0.225 | 24 | 0.75 | 1712 | 307 sec |
| 5 | 0.225 | 24 | 1 | 1713 | 318 sec |
| 6 | 0.225 | 24 | 1.25 | 1714 | 288 sec |
| 7 | 0.225 | 28 | 0.75 | 1715 | 306 sec |
| 8 | 0.225 | 28 | 1 | 1716 | 296 sec |
| 9 | 0.225 | 28 | 1.25 | 1717 | 291 sec |
| 10 | 0.175 | 28 | 0.75 | 1706 | 361 sec |
| 11 | 0.175 | 28 | 1 | 1705 | 298 sec |
| 12 | 0.175 | 28 | 1.25 | 1708 | 287 sec |
| 13 | 0.175 | 32 | 1 | 1709 | 293 sec |
| 14 | 0.175 | 32 | 0.75 | 1710 | 307 sec |
| 15 | 0.175 | 32 | 1.25 | 1711 | 290 sec |
| 16 | 0.225 | 32 | 0.75 | 1718 | 333 sec |
| 17 | 0.225 | 32 | 1 | 1719 | 293 sec |
| 18 | 0.225 | 32 | 1.25 | 1720 | 286 sec |

In summary, the average tray completion times as a function only of traverse velocity were as shown in the table below. This indicates that either 1.0 or 1.25 inches/second (2.54 or 3.175 cm/second) velocities will result in a tray completion time of less than 300 seconds.

| Traverse Velocity, inches/second | Average Tray Completion Time, Sec |
|---|---|
| 0.75 | 305.8 |
| 1.0 | 294.8 |
| 1.25 | 288.8 |

Transfer Volume Fluid

For this experiment, residual transfer fluid volumes were proposed to be less than 7.5 µL. The mass of residual Organic Solution measured for each condition ranged from a minimum value of 0.0000 gm to a maximum of 0.0009 gm over all conditions tested, so the worst case observed in this experiment was significantly less than 2 µL. The table below provides the averages for each tray. Given that the worst-case average was only 0.0027 gm, or 0.35 µL, it was safe to conclude that all test conditions satisfied the experimental proposal.

| Tray | Gap, in. | Flow, L/min | Traverse speed, inches/second | Average Mass Residual Fluid, grams |
|---|---|---|---|---|
| 1 | 0.175 | 24 | 0.75 | 0.00020 |
| 2 | 0.175 | 24 | 1 | 0.00020 |
| 3 | 0.175 | 24 | 1.25 | 0.00027 |
| 4 | 0.225 | 24 | 0.75 | 0.00007 |
| 5 | 0.225 | 24 | 1 | 0.00002 |
| 6 | 0.225 | 24 | 1.25 | 0.00006 |
| 7 | 0.225 | 28 | 0.75 | 0.00004 |
| 8 | 0.225 | 28 | 1 | 0.00003 |
| 9 | 0.225 | 28 | 1.25 | 0.00008 |
| 10 | 0.175 | 28 | 0.75 | 0.00004 |
| 11 | 0.175 | 28 | 1 | 0.00005 |
| 12 | 0.175 | 28 | 1.25 | 0.00003 |
| 13 | 0.175 | 32 | 1 | 0.00004 |
| 14 | 0.175 | 32 | 0.75 | 0.00001 |
| 15 | 0.175 | 32 | 1.25 | 0.00004 |
| 16 | 0.225 | 32 | 0.75 | 0.00004 |
| 17 | 0.225 | 32 | 1 | 0.00000 |
| 18 | 0.225 | 32 | 1.25 | 0.00007 |

Coverslip X- and Y-Alignment

Coverslip misalignment was observed in only 10 of the 360 slides processed. Of those 10 failures, 8 occurred under conditions where the air flow rate was 32 L/min. Those 8 failures appear to be consistent with coverslip migration caused by high air flow rate. Of the 8 failures observed for conditions in which the flow rate was 32 L/min, 7 were observed at an air knife gap height of 0.175 inches (0.4445 cm), and 1 was observed at an air knife gap height of 0.225 inches (0.5715 cm). The lower gap height is likely to be a worst-case condition. Of the other two misalignments, one was found at the time to be inserted in the tray incorrectly, so that the slide was not properly seated. However, even if this single event were in fact related to the air knife operation, the observed failure rate in all 240 slides at 24 or 28 L/min flow rate constitutes a failure rate of 1/240 slides or 0.4%, which may be deemed acceptable for this experiment. The table which follows provides a listing of observed coverslip alignment failures.

| Test Condition | Slide position | Number of Labels | Air Knife Gap Height | Air Flow, L/minute | Traverse Speed, inches/second | X-Axis Alignment: 0 = Pass; 1 = Fail | Y-Axis Alignment: 0 = Pass; 1 = Fail |
|---|---|---|---|---|---|---|---|
| 16 | 11 | 0 | 0.225 | 32 | 0.75 | 1 | 1 |
| 8 | 11 | 2 | 0.225 | 28 | 1 | 0 | 1 |
| 14 | 12 | 0 | 0.175 | 32 | 0.75 | 0 | 1 |
| 14 | 20 | 0 | 0.175 | 32 | 0.75 | 0 | 1 |
| 15 | 7 | 0 | 0.175 | 32 | 1.25 | 0 | 1 |
| 15 | 11 | 2 | 0.175 | 32 | 1.25 | 0 | 1 |
| 7 | 1 | 2 | 0.225 | 28 | 0.75 | 1 | 0 |
| 13 | 18 | 0 | 0.175 | 32 | 1 | 1 | 0 |
| 13 | 20 | 0 | 0.175 | 32 | 1 | 1 | 0 |
| 14 | 6 | 0 | 0.175 | 32 | 0.75 | 1 | 0 |

Glue Residue, Top Non-Label

The average observed glue residue streak length was approximately 55 mm in baseline samples (not the experimental samples). By definition, this value was restricted to glue residue observed on the top surface of the coverslip. No baseline existed for other areas on the slide.

Figure 13A:
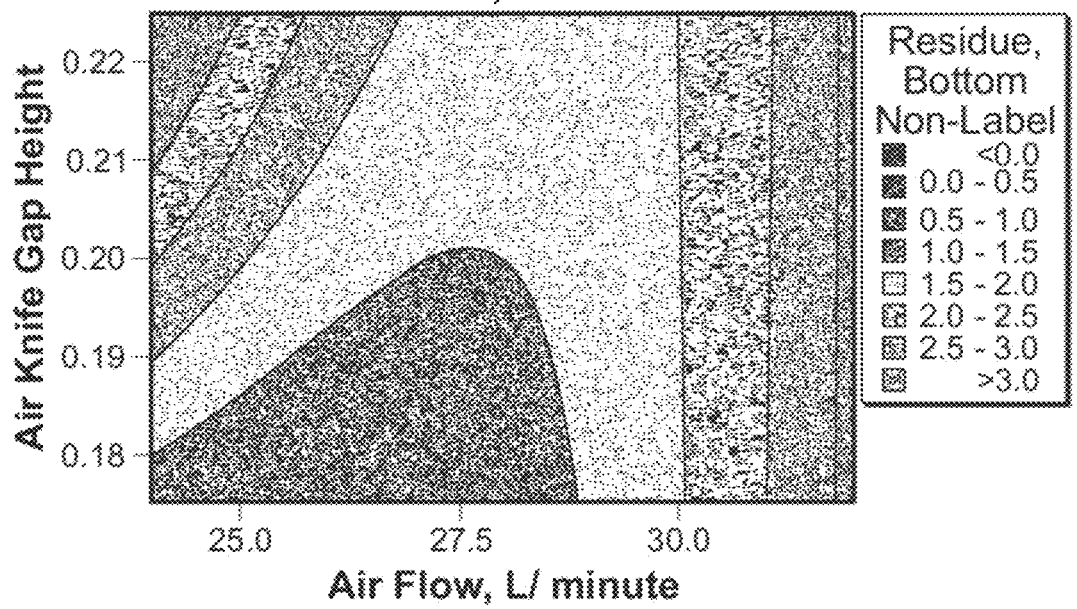
FIG. 13A provides a contour plot showing the average value of Residue, Non-Label, in mm, as a function of gap height in inches vs. air flow in L/minute.
Figure 13B:
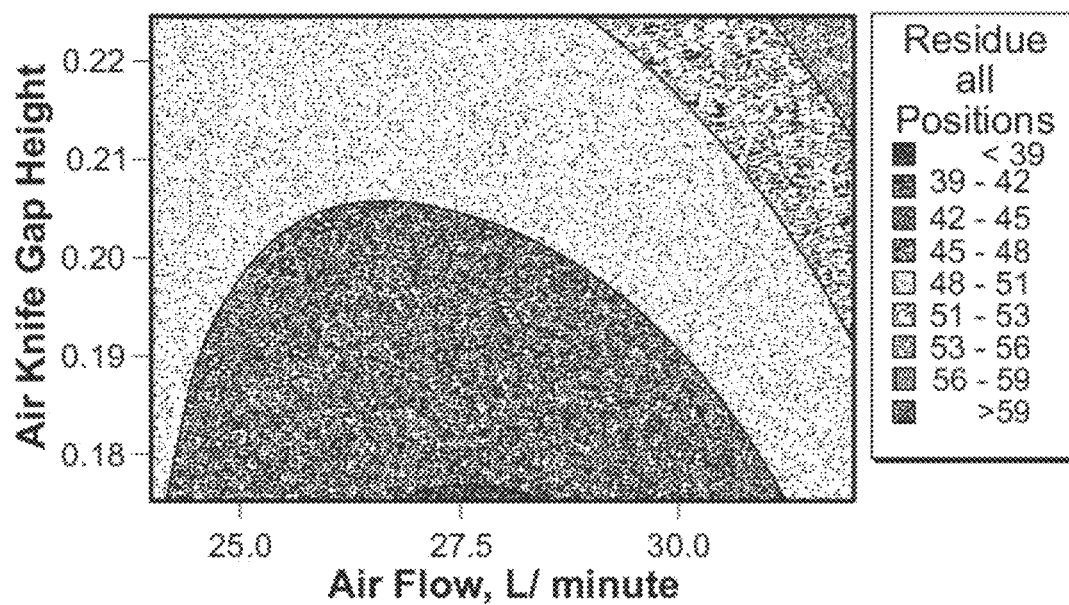
FIG. 13B provides a contour plot showing the average of measured glue residue, all positions (mm) as a function of gap height in inches vs. air flow in L/minute.
Figure 13C:
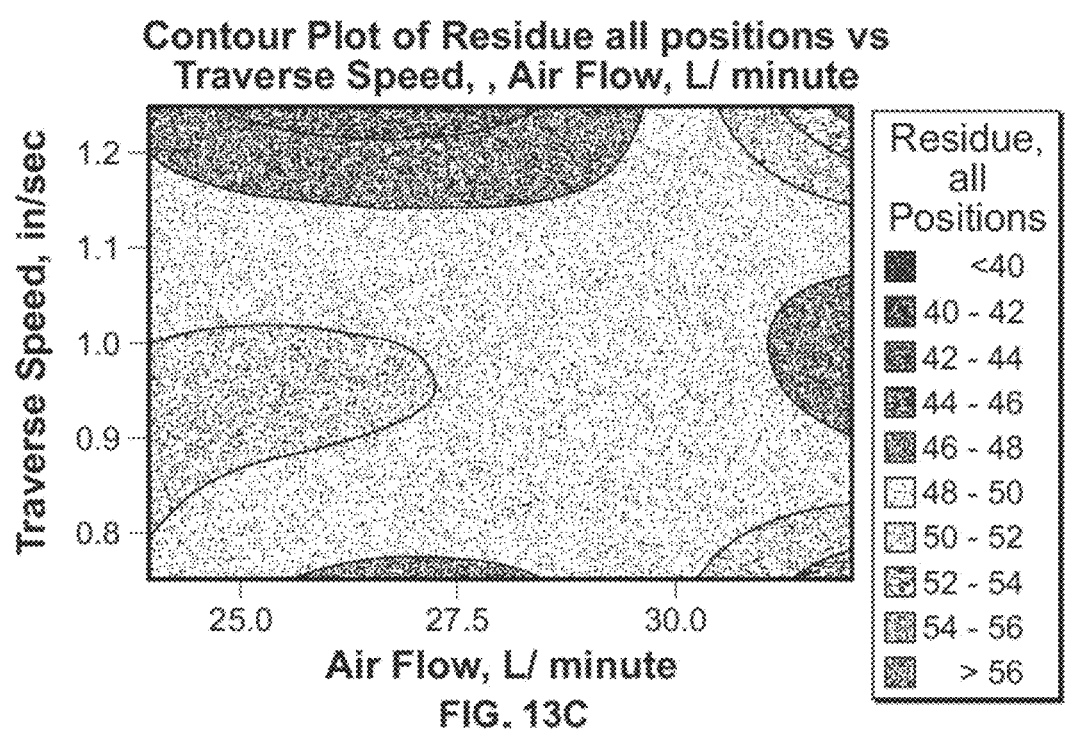
FIG. 13C provides a contour plot showing the average of measured glue residue, all positions (mm) as a function of traverse speed inches/sec vs. air flow in L/minute.

From all of the 360 slides coverslipped in this protocol, only one slide showed any glue residue on top of the coverslip. This one slide had a small spot, with a measured length of 2 mm. The single failure occurred at test condition 18, which employed an air flow rate of 32 L/min, an air knife gap height of 0.225 inches (0.5715 cm), and a traverse velocity of 1.25 inches per second (3.175 cm/second). By restricting air flow to between 24 and 28 L/min, there were zero observed incidents of measurable glue residue on top of the coverslip. FIG. 13A sets forth a contour plot which shows the average value of Residue, Non-Label, in mm, as a function of gap height in inches vs. air flow in L/minute. Smaller values are preferred. FIG. 13B sets forth a contour plot which shows the average of measured glue residue, all positions (mm) as a function of gap height in inches vs. air flow in L/minute. Smaller values of residue are again preferred. FIG. 13C sets forth a contour plot which shows the average of measured glue residue, all positions (mm) as a function of traverse speed in inches/sec vs. air flow in L/minute. Smaller values of residue are once again preferred.

Residue, All Positions

Although the data for glue residue was tabulated individually for four different positions on the slide, glue in regions other than the coverslip surface may conveniently be added together to provide an overall impact assessment that allows one to observe which choices may lead to less total residue. Note that nearly all of this residue was observed on top of the label and beneath the label on each slide, and as such, is not considered an impediment to pathological review of specimens. FIG. 13B below shows the average of measured glue residue, all positions (mm) as a function of gap height in inches vs. air flow in L/minute. Smaller values of residue are preferred. Observations show that most of the residue observed was on the top and bottom of the label area, in particular at the regions where the slide tray clips contact the top and the bottom of the label areas. This residue does not pose a significant risk of occluding the information on the label.

Bubbles

Initially, 200 slides were processed according to procedures known in the art. Of those 200 slides, 0 showed any bubbles greater than 0.5 mm diameter, and 17 slides had one or more bubbles with diameters less than or equal to 0.5 mm, for a rate of 8.5%, showing one or more bubble.

Bubbles were assessed for each slide coverslipped in this protocol. A separate count was made for number of bubbles with diameters less than or equal to 0.5 mm, and for bubbles with diameters greater than 0.5 mm. However, there was only one slide in the entire study (out of 360 slides) that showed a bubble with diameter greater than 0.5 mm. The test conditions for the slide having the bubbles is noted in the table below:

| Test Condition | Slide position | Number of Labels | Air Knife Gap Height | Air Flow, L/minute | Traverse Speed, inches/second | Bubbles <= 0.5 mm | Bubbles > 0.5 mm |
|---|---|---|---|---|---|---|---|
| 6 | 10 | 0 | 0.225 | 24 | 1.25 | 0 | 1 |

The remaining bubbles observed in the characterization protocol were bubbles of diameter less than or equal to 0.5 mm. 39 slides out of the 360 (10.8%) processed were found to have bubbles. We carefully considered the test conditions that showed worse bubble counts and concluded that by eliminating air knife gap height of 0.175 inches (0.4445 cm), and air flow rate of 32 L/min, and by limiting the traverse speed to 1 inch/second (2.54 cm/second), the bubble count could be improved dramatically, down to only 1 slide out of 40, or 2.5%.

Generally, we observe that (i) lower air knife heights appear to incur more bubbles than higher air knife heights; (ii) slower air knife traverse velocities appear to have more bubbles than faster velocities; and (iii) faster air flow rates appear to incur more bubbles than lower air flow rates. One hypothesis that could explain all of these phenomena is the hypothesis that bubbles may form more readily when the air knife completely dries an area to be coverslipped. It should also be noted that the air knife configuration has a gap height of 0.210 inches (0.5334 cm) (compared with prior art air knives having a nominal gap height of 0.115 inches (0.2921 cm)), a traverse velocity of 1.0 inch/second (2.54 cm/second) (compared with prior art air knives having a normal traverse velocity of 0.5 inches/second (1.27 cm/second)), and an air flow rate of 26 L/min (compared with prior art air knives having an air flow rate of 47.5 L/min).

ADDITIONAL EMBODIMENTS

Additional Embodiment 1

An automated slide processing apparatus comprising:
　at least one fluid dispenser configured to dispense a fluid onto an upper surface of a slide; and
　a liquid removal device for driving the dispensed fluid on the upper surface of the slide toward at least one of (i) a wicking feature in communication with at least a portion of an end of the slide, or (ii) a longitudinal edge of the slide; where the liquid removal device projects a gas curtain having a shape which approximates a parallelogram.

Additional Embodiment 2

The automated slide processing apparatus of additional embodiment 1, wherein the liquid removal device is movable in a direction substantially perpendicular to a longitudinal axis of the slide.

Additional Embodiment 3

The automated slide processing apparatus of any of the preceding additional embodiments, wherein the gas curtain projected from the liquid removal device is oriented substantially perpendicular to a plane of the upper surface of the slide.

Additional Embodiment 4

The automated slide processing apparatus of additional embodiment 3, wherein the gas curtain is offset at a predetermined slant angle relative to a longitudinal axis of the liquid removal device.

Additional Embodiment 5

The automated slide processing apparatus of any of the preceding additional embodiments, wherein the wicking feature is a slide retaining clip.

Additional Embodiment 6

The automated slide processing apparatus of additional embodiment 5, wherein the slide retaining clip is located at a label end of the slide.

Additional Embodiment 7

The automated slide processing apparatus of any of the preceding additional embodiments, wherein the automated slide processing apparatus is a coverslipper apparatus and wherein the liquid removal device facilitates removal of at least residual fluid after application of a coverslip.

Additional Embodiment 8

The automated slide processing apparatus of any of additional embodiments 1 to 6, wherein the automated slide processing apparatus is a staining apparatus and wherein the liquid removal device facilitates removal of the fluid dispensed onto a specimen located on the upper surface of the slide, the dispensed fluid selected from the group consisting of a staining reagent, a counterstaining reagent, or a wash reagent.

Additional Embodiment 9

An automated slide processing apparatus comprising:
　(i) at least one fluid dispenser configured to dispense a fluid onto a slide; and
　(ii) a gas knife configured to direct a fluid along a processing pathway and toward at least one of (i) a wicking feature in communication with at least a portion of an end of the slide, or (ii) a longitudinal edge of the slide;
　　wherein the gas knife includes a plurality of discrete gas outlets in fluidic communication with a plenum, the plurality of discrete gas outlets each providing a gaseous output that merge to form a substantially uniform gas curtain, and
　　wherein the substantially uniform gas curtain is offset at a slant angle of at least 10 degrees relative to a longitudinal axis of the plenum.

Additional Embodiment 10

The automated slide processing apparatus of additional embodiment 9, wherein the wicking feature provides a wicking contact to facilitate removal of the fluid from the slide.

Additional Embodiment 11

The automated slide processing apparatus of additional embodiment 10, wherein the wicking feature is located at a label end of the slide.

Additional Embodiment 12

The automated slide processing apparatus of additional embodiment 9, wherein the wicking feature is a retaining clip.

Additional Embodiment 13

The automated slide processing apparatus of any of additional embodiments 9 to 12, wherein the gas knife is movable in a direction substantially perpendicular to the longitudinal axis of the slide.

Additional Embodiment 14

The automated slide processing apparatus of additional embodiment 13, wherein the gas knife is movable at a velocity ranging from about 0.75 inches/second (1.905 cm/second) to about 1.25 inches/second (3.175 cm/second).

Additional Embodiment 15

The automated slide processing apparatus of any of additional embodiments 9 to 14, wherein the gas knife is configured to move in a first direction substantially perpendicular to the longitudinal axis of the slide and toward a first longitudinal edge to urge the fluid towards a first wicking feature; and wherein the device is operable in a second direction substantially perpendicular to the longitudinal axis of the slide and toward a second longitudinal edge to urge fluid toward a second wicking feature.

Additional Embodiment 16

The automated slide processing apparatus of additional embodiment 15, wherein the first direction and the second direction are opposite each other but within the same plane.

Additional Embodiment 17

The automated slide processing apparatus of any of additional embodiments 9 to 16, wherein any two adjacent gas outlets provide substantially the same gas flow rate.

Additional Embodiment 18

The automated slide processing apparatus of any of additional embodiments 9 to 17, wherein the substantially uniform gas curtain provides a flow rate of between about 10 L/min to about 20 L/min.

Additional Embodiment 19

The automated slide processing apparatus of any of additional embodiments 9 to 18, wherein an angle of incidence between the substantially uniform gas curtain and the fluid on the slide is about 90 degrees.

Additional Embodiment 20

The automated slide processing apparatus of any of additional embodiments 9 to 19, wherein the slant angle ranges from between about 20 degrees to about 40 degrees.

Additional Embodiment 21

The automated slide processing apparatus of any of additional embodiments 9 to 20, wherein the slant angle is about 30 degrees.

Additional Embodiment 22

The automated slide processing apparatus of any of additional embodiments 9 to 21, wherein the substantially uniform gas curtain imparts a flow having a first component which is parallel to the longitudinal axis of the slide and a second component along the direction of movement of the gas knife.

Additional Embodiment 23

The automated slide processing apparatus of any of additional embodiments 9 to 22, wherein a length of the gas curtain approximates a length of the slide.

Additional Embodiment 24

A method of moving a fluid present on an upper surface of a slide, comprising:
(a) positioning a gas knife proximal a first longitudinal edge of a slide, the gas knife providing a substantially uniform gas curtain directed toward the slide, the gas curtain having a gas flow rate of between about 10 L/min to about 20 L/min; and
(b) moving the gas knife across the slide at a velocity of between about 0.75 inches/second (1.905 cm/second) and about 1.25 inches/second (3.175 cm/second) in a direction substantially perpendicular to the longitudinal axis of the slide, wherein the gas knife maintains a height separation from the upper surface of the slide throughout its movement, the height separation ranging from between about 0.4 cm to about 0.6 cm.

Additional Embodiment 25

The method of additional embodiment 24, wherein the gas curtain imparts a gas flow having at least a first component which is parallel to the longitudinal axis of the slide.

Additional Embodiment 26

The method of any of additional embodiments 24 to 25, wherein the gas curtain directs the fluid toward at least a wicking feature in communication with the slide.

Additional Embodiment 27

The method of any of additional embodiments 24 to 26, wherein the gas knife is moved in a first direction substantially perpendicular to the longitudinal axis of the slide and ends at a position proximal to a second longitudinal edge of the slide.

Additional Embodiment 28

The method of additional embodiment 27, wherein the fluid is directed toward the second longitudinal edge and/or toward a second wicking feature at a label end of the slide.

Additional Embodiment 29

The method of any of additional embodiments 27 to 28, further comprising the step of moving the gas knife is a second direction originating at a position proximal the second longitudinal edge of the slide and toward the first longitudinal edge of the slide.

Additional Embodiment 30

The method of additional embodiment 29, wherein the fluid is directed toward the first longitudinal edge and/or toward a first wicking feature at the label end of the slide.

Additional Embodiment 31

The method of any of additional embodiments 24 to 30, wherein the method further comprises positioning a fluid dispenser over an upper surface of the slide and dispensing an additional fluid at least onto a specimen located on the upper surface of the slide.

Additional Embodiment 32

A gas knife comprising a plenum and a plurality of outlets in fluidic communication with the plenum, the plurality of outlets arranged in parallel along an end of the plenum, each gas outlet having a slant angle relative to a longitudinal axis of the plenum ranging from between about 20 degrees to about 40 degrees, and wherein a ratio between a length of the outlet and a diameter of the outlet is greater than 5.

Additional Embodiment 33

The gas knife of additional embodiment 32, wherein the plurality of outlets are provided at a pitch of between about 3 and about 20 outlets per inch (2.54 cm).

Additional Embodiment 34

The gas knife of additional embodiment 33, wherein the pitch ranges from between about 5 and about 15 outlets per inch (2.54 cm).

Additional Embodiment 35

The gas knife of additional embodiment 33, wherein the pitch ranges from between about 8 to about 12 outlets per inch (2.54 cm).

Additional Embodiment 36

The gas knife of additional embodiment 33, wherein the pitch is about 10 outlets per inch (2.54 cm).

Additional Embodiment 37

The gas knife of any of additional embodiments 32 to 36, wherein the ratio between the length of the outlet and the diameter of the outlet is greater than 7.5.

Additional Embodiment 38

The gas knife of additional embodiment 37, wherein the ratio is greater than 10.

Additional Embodiment 39

The gas knife of any of additional embodiments 32 to 38, wherein the slant angle of the outlet relative to the longitudinal axis of the plenum ranges from between about 25 degrees to about 30 degrees.

Additional Embodiment 40

The gas knife of additional embodiment 39, wherein the slant angle is about 30 degrees.

Additional Embodiment 41

The gas knife of additional embodiment 32, wherein the angle of the outlet relative to the longitudinal axis of a plenum is about 30 degrees; wherein the plurality outlets are provided at a pitch of between about 8 and about 12 outlets per inch (2.54 cm); and wherein the ratio between the length of the outlet and the diameter of the outlet is greater than 5.

Additional Embodiment 42

An automated coverslipper comprising a fluid dispenser; and the gas knife of any of additional embodiments 32 to 41.

Additional Embodiment 43

The automated coverslipper of additional embodiment 42, further comprising a lifter head for applying a coverslip to a slide.

Additional Embodiment 44

An automated slide staining apparatus comprising a fluid dispenser capable of delivering a reagent to an upper surface of a slide; and the gas knife of any of additional embodiments 32 to 41.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications, and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. An automated slide processing apparatus comprising:
at least one fluid dispenser configured to dispense a fluid onto an upper surface of a slide; and
a liquid removal device for driving the dispensed fluid on the upper surface of the slide toward at least one of (i) one or more retaining clips in fluidic communication with at least a portion of an end of the slide, or (ii) a longitudinal edge of the slide;
wherein the liquid removal device comprises (i) a body; (ii) a plenum housed within the body; and (iii) a plurality of discrete gas outlets formed within the body and in communication with the plenum, wherein the plurality of discrete gas outlets is arranged substantially along a longitudinal axis of the body,
wherein each of the plurality of discrete gas outlets has a slant angle ranging from between about 5 degrees to about 50 degrees and a tilt angle ranging from between about 5 degrees to about 50 degrees, wherein the slant angle is the angle in which each gas outlet of the plurality of discrete gas outlets is formed within the body relative to the longitudinal axis of the body, and wherein the tilt angle is the angle in which each gas outlet of the plurality of discrete gas outlets is formed within the body relative to a line along an axis perpendicular to the longitudinal axis of the body;
where the plurality of discrete gas outlets each provide a gaseous output that merge to form a substantially uniform gas curtain, and wherein the gas curtain projected from the liquid removal device has a shape which approximates a parallelogram having two obtuse angles and two acute angles.

2. The automated slide processing apparatus of claim 1, wherein the gas curtain projected from the liquid removal device is oriented substantially perpendicular to a plane of the upper surface of the slide.

3. The automated slide processing apparatus of claim 1, wherein the retaining clip is located at a label end of the slide.

4. The automated slide processing apparatus of claim 1, wherein the automated slide processing apparatus is a coverslipper apparatus and wherein the liquid removal device facilitates removal of at least residual fluid after application of a coverslip.

5. The automated slide processing apparatus of claim 1, wherein the automated slide processing apparatus is a staining apparatus and wherein the liquid removal device facilitates removal of the fluid dispensed onto a specimen located on the upper surface of the slide, the dispensed fluid selected from the group consisting of a staining reagent, a counterstaining reagent, and a wash reagent.

6. The automated slide processing apparatus of claim 1, wherein the liquid removal device is movable in a direction substantially perpendicular to the longitudinal axis of the slide.

7. The automated slide processing apparatus of claim 6, wherein the liquid removal device is movable at a velocity ranging from about 0.75 inches/second (1.905 cm/second) to about 1.25 inches/second (3.175 cm/second).

8. The automated slide processing apparatus of claim 1, wherein the slide is in fluidic communication with a first retaining clip and where the liquid removal device is configured to move in a first direction substantially perpendicular to the longitudinal axis of the slide and toward a first longitudinal edge to urge the fluid toward the first retaining clip.

9. The automated slide processing apparatus of claim 1, wherein any two adjacent gas outlets of the plurality of discrete gas outlets provide about the same gas flow rate.

10. The automated slide processing apparatus of claim 9, wherein the substantially uniform gas curtain provides a flow rate of between about 10 L/min to about 20 L/min.

11. The automated slide processing apparatus of claim 9, wherein the substantially uniform gas curtain imparts a gas flow having a first component which is parallel to the longitudinal axis of the slide and a second component along the direction of movement of the liquid removal device.

12. The automated slide processing apparatus of claim 1, wherein the slant angle ranges from between about 10 and about 40 degrees.

13. The automated slide processing apparatus of claim 1, wherein the slant angle ranges from between about 25 and about 35 degrees.

14. The automated slide processing apparatus of claim 8, wherein the liquid removal device further comprises a second retaining clip.

15. The automated slide processing apparatus of claim 14, wherein the slide is in fluidic communication with the second retaining clip and where the liquid removal device is configured to move in a second direction substantially perpendicular to the longitudinal axis of the slide and toward a second longitudinal edge to urge the fluid toward the second retaining clip.

* * * * *